United States Patent
Schnapp et al.

(10) Patent No.: US 10,379,975 B2
(45) Date of Patent: *Aug. 13, 2019

(54) METHOD FOR REMOTE ASYNCHRONOUS REPLICATION OF VOLUMES AND APPARATUS THEREFOR

(71) Applicant: Infortrend Technology, Inc., New Taipei (TW)

(72) Inventors: Michael Gordon Schnapp, New Taipei (TW); Ching-Hua Fang, Taipei (TW)

(73) Assignee: INFORTREND TECHNOLOGY, INC., New Taipei (TW)

( * ) Notice: Subject to any disclaimer, the term of this patent is extended or adjusted under 35 U.S.C. 154(b) by 276 days.

This patent is subject to a terminal disclaimer.

(21) Appl. No.: 15/429,682

(22) Filed: Feb. 10, 2017

(65) Prior Publication Data
US 2017/0153954 A1 Jun. 1, 2017

Related U.S. Application Data

(62) Division of application No. 12/691,826, filed on Jan. 22, 2010, now Pat. No. 9,569,321.
(Continued)

(51) Int. Cl.
*G06F 11/20* (2006.01)
*G06F 3/06* (2006.01)

(52) U.S. Cl.
CPC .......... *G06F 11/2066* (2013.01); *G06F 3/064* (2013.01); *G06F 3/065* (2013.01);
(Continued)

(58) Field of Classification Search
None
See application file for complete search history.

(56) References Cited

U.S. PATENT DOCUMENTS

| 5,263,154 A | 11/1993 | Eastridge et al. |
| 5,375,232 A | 12/1994 | Legvold et al. |

(Continued)

FOREIGN PATENT DOCUMENTS

| CN | 101008886 A | 8/2007 |
| EP | 1816563 A2 | 8/2007 |

OTHER PUBLICATIONS

Neeta Garimella. Understanding and exploiting snapshot technology for data protection, Part 1: Snapshot technology overview. IBM developerWorks Tivoli Techincallibrary [online], [retrieved on Jan. 27, 2012]. Retrieved from the Internet <URL: http://www.ibm.com/developerworks/tivoli/library/t -snaptsm 1 /index. html>.

*Primary Examiner* — Edward J Dudek, Jr.
*Assistant Examiner* — Ralph A Verderamo, III
(74) *Attorney, Agent, or Firm* — McClure, Qualey & Rodack, LLP

(57) ABSTRACT

A method for remote asynchronous volume replication and apparatus therefor. Asynchronous replication is applied to handle data changes on the source volume on the local site incurred by Host IO requests. In coordination with the "point-in-time differential backup" technology, the original data in the block to be written by a host IO request will be backuped to Source BAS on the local site (backup-on-write operation) only when the original data being written into the block of the source volume is different from the data of the corresponding block of the destination volume on the remote site. As a result, once a new data is written into the source volume completely, the host will be responded that its Host IO request is completed. Therefore, the data necessarily transmitted to the destination volume can be minimized, and the problem of remote data transmission limited by network bandwidth can be prevented effectively.

34 Claims, 20 Drawing Sheets

Related U.S. Application Data

(60) Provisional application No. 61/146,655, filed on Jan. 23, 2009.

(52) U.S. Cl.
CPC ............ *G06F 3/067* (2013.01); *G06F 3/0619* (2013.01); *G06F 3/0665* (2013.01); *G06F 11/2069* (2013.01); *G06F 11/2074* (2013.01)

(56) References Cited

U.S. PATENT DOCUMENTS

| | | |
|---|---|---|
| 6,912,629 B1 | 6/2005 | West et al. |
| 6,950,915 B2 | 9/2005 | Ohno et al. |
| 7,277,997 B2 | 10/2007 | Vincent |
| 7,337,286 B1 | 2/2008 | West et al. |
| 7,464,236 B2 | 12/2008 | Sano et al. |
| 7,475,294 B2 | 1/2009 | Maki et al. |
| 7,526,618 B2 | 4/2009 | Ozaki et al. |
| 7,606,841 B1 | 10/2009 | Ranade |
| 7,613,674 B2 | 11/2009 | Uchikado et al. |
| 7,650,477 B2 | 1/2010 | Deguchi et al. |
| 7,657,578 B1 | 2/2010 | Karr et al. |
| 7,827,366 B1 | 11/2010 | Nadathur et al. |
| 2003/0051111 A1 | 3/2003 | Nakano et al. |
| 2003/0177306 A1 | 9/2003 | Cochran et al. |
| 2004/0103254 A1 | 5/2004 | Satoyama et al. |
| 2005/0210210 A1 | 9/2005 | Arai et al. |
| 2005/0268054 A1 | 12/2005 | Werner et al. |
| 2006/0031637 A1 | 2/2006 | Komikado et al. |
| 2006/0107007 A1 | 5/2006 | Hirakawa et al. |
| 2006/0195668 A1 | 8/2006 | Nakano et al. |
| 2006/0236048 A1 | 10/2006 | Deguchi et al. |
| 2007/0156982 A1 | 7/2007 | Meiri et al. |
| 2007/0174569 A1 | 7/2007 | Schnapp et al. |
| 2007/0233980 A1 | 10/2007 | Cox et al. |
| 2007/0245105 A1 | 10/2007 | Suzuki et al. |
| 2007/0266212 A1 | 11/2007 | Uchikado et al. |
| 2008/0059736 A1 | 3/2008 | Murayama et al. |
| 2008/0104443 A1 | 5/2008 | Akutsu et al. |
| 2008/0215835 A1 | 9/2008 | Hirakawa et al. |
| 2008/0301386 A1 | 12/2008 | Matsui et al. |
| 2009/0043979 A1 | 2/2009 | Jarvis |
| 2009/0094426 A1 | 4/2009 | Ikeda et al. |
| 2009/0094428 A1 | 4/2009 | Nagata et al. |
| 2009/0119467 A1 | 5/2009 | Emaru et al. |
| 2009/0228670 A1 | 9/2009 | Nakagawa et al. |
| 2009/0228671 A1 | 9/2009 | Shigemura et al. |
| 2010/0005260 A1 | 1/2010 | Inoue et al. |
| 2010/0011368 A1 | 1/2010 | Arakawa et al. |
| 2010/0306488 A1 | 12/2010 | Stroberger |

METHOD FOR REMOTE ASYNCHRONOUS REPLICATION OF VOLUMES AND APPARATUS THEREFOR

CROSS REFERENCE TO RELATED APPLICATION(S)

This application is a Divisional of U.S. patent application Ser. No. 12/691,826, filed on Jan. 22, 2010, which claims the benefit of provisional Application No. 61/146,655, filed on Jan. 23, 2009, the entirety of which are incorporated by reference herein.

BACKGROUND

Field of Invention

The present invention relates to a method for replication of volumes and apparatus therefor. More particularly, the present invention relates to a method for remote asynchronous replication of volumes and apparatus therefor.

Description of Related Art

Storage devices are so widely applied in various computer systems or storage systems in the modern society. Depending on the various purposes of storage, one kind of storage devices, or called "primary storage devices", are designed to store data required for routine access in system operations. Other kind of storage devices, or called "secondary storage devices", are designed to store backup data of the primary storage devices. The secondary storage devices can replace the primary storage devices for allowing the system to keep normal operations so as to increase reliability of the system while the primary storage devices suffer failure or malfunction.

The storage devices, which include hard disk drives, tapes, memory drives, optical storage drives, or other storage devices for storing data, are generally called physical storage devices (PSDs).

The storage system (or the computer system) manages data rather than taking a whole PSD as a unit, but using a technology of storage virtualization that has been used to virtualize physical storage by combining various sections of one or more PSDs into a logical drive (LD) or a partition. The LD or the partition is called a logical unit number (LUN) if it is mapped to a host for accessing by a controller. A LD or a partition can be further divided into one or more data storage areas, called media extends. Many storage systems may replicate some or all of their volumes in integrality into other volumes. Therefore, the original data that is destroyed or cannot be read may be recovered or replaced by the replicated data, or the replicated data may be used as the substitution of the original data for some other applications.

The replicated data may be originated from a source volume and stored into a destination volume. The volume as a unit for data replication can be used to various applications, for example, being a backup, a report, a filing of the source volume; or operations for replacing any operation required by the source volume, for examples, simulating, predicting, data mining or the like. More specifically, many data accessing operations have to lock the data going to be accessed, so that it is unpreventable to affect the performance of reading and writing data, as well as the affection of the normal data access of the host. If the destination volume instead of the source volume performs the above operations, it could allow the host to access the data without affecting the performance of the source volume.

Although the volume replication has varous advantages and functions as aforementioned. Once the whole storage system or storage devices are destroyed physically by some severe accidents, for example, earthquakes, fire accidents or terroristic attacks, the backup data and the source data stored on the same site of the storage system will not ensure the data being safe, propably resulting in permanent loss of the important data.

In order to solve the above problems, a remote volume replication method is developed for ensuring the data being safe in the manner of replicating the important data to a remote storage device on another site.

However, the network transmission is required for replicating the data on the local site to the storage device on the remote site. Thus, the bandwidth limitation of the network wire is the bottleneck of the remote volume replication. With respect to the remote volume replication, there is a need of a replication technology that can avoid the remote volume transmission from being limited by the bottleneck, so as to minimize the influence of the operating performance of the storage system.

SUMMARY

Accordingly, an aspect of the present invention is to provide a method for remote asynchronous replication of volumes and apparatus therefore, for improving remote data transmission limited by the network bandwidth and keeping the operation performance of the storage system at a better level.

According to an embodiment, the present invention features a method for remote asynchronous replication of volumes, comprising: mirroring a source volume located on a first site to a destination volume located on a second site; receiving a Host input/output (IO) request, wherein the Host IO request is sent from a host located on the first site for writing an updated data set into a first data block of the source volume located on the first site; executing a backup-on-write operation, wherein the backup-on-write operation determines whether an original data set of the first data block of the source volume located on the first site is the same with a data set of a second data block, corresponding to the first data block, of the destination volume, so as to determine whether the original data set of the first data block of the source volume is backuped to a first backup image located on the first site or not; writing the updated data set into the first data block of the source volume located on the first site; and responding the host that the Host IO request has been completed.

According to another embodiment, the present invention features a system for remote asynchronous volume replication, comprising: a first storage virtualization subsystem located on a first site, comprising a first controller and a first storage unit, wherein the first storage unit has a first volume and a first backup image; a second storage unit located on a second site, wherein the second storage unit has a second volume; and a host located on the first site and coupled with the first storage virtualization subsystem, wherein the host sends a Host IO request to the first volume of the first storage virtualization subsystem; wherein when the first controller of the first storage virtualization subsystem receives the Host IO request, a backup-on-write operation is executed to determine whether an original data set of a first data block, which is to be written, of the source volume on the first site is the same with a data set of a second data block, corresponding to the first data block, of the second volume on the second site, so as to determine whether the original data of the first data block of the first volume is backuped to the first backup image or not; writing an updated data of the Host IO request into the first data block of the first volume by the first controller; and responding the host that the Host IO request is completed.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
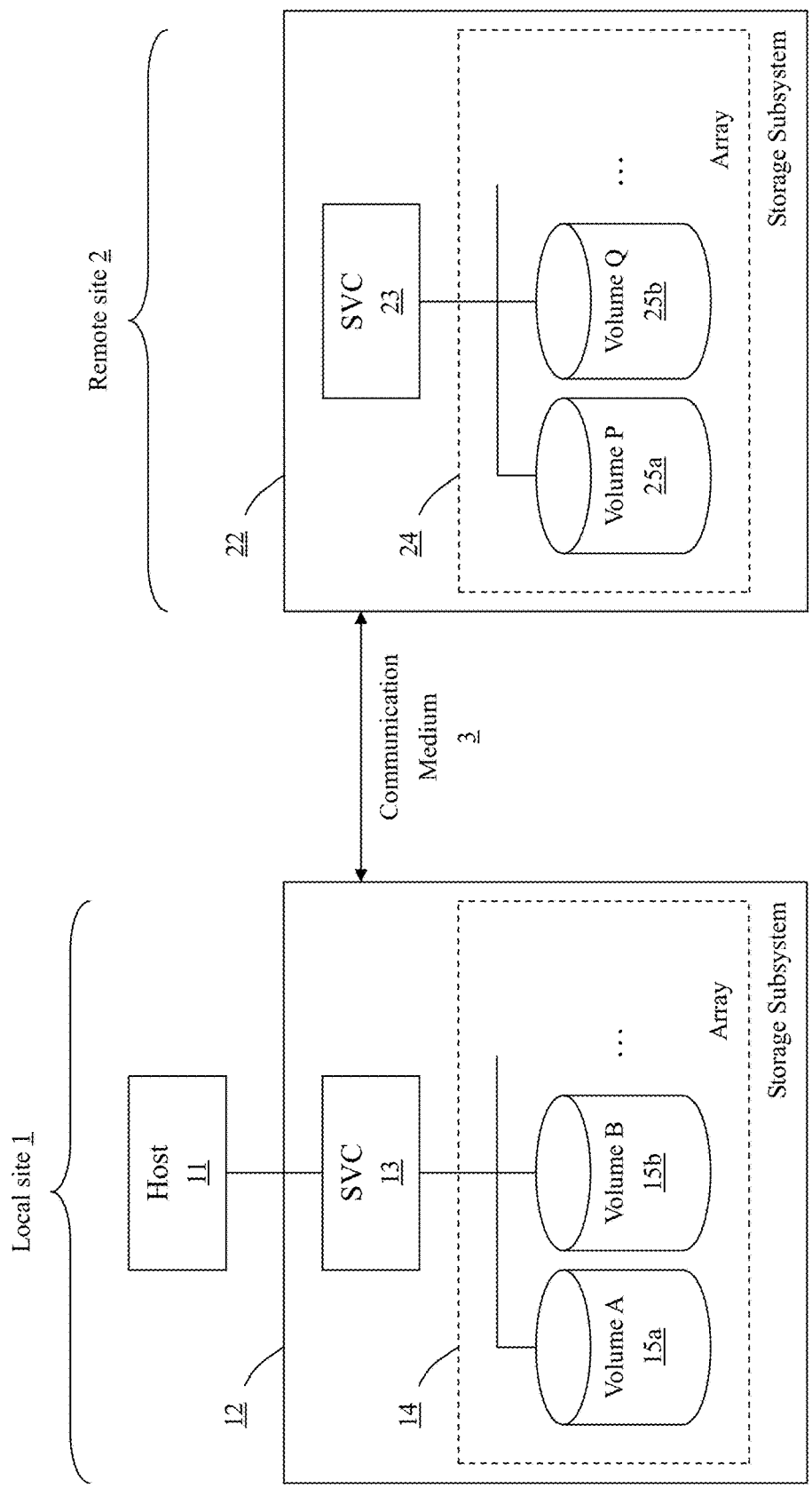
FIG. 1 depicts a diagram of a hardware structure of a computer system on the local site and the remote site according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

The present invention provides a method for remote asynchronous replication of volumes and apparatus therefor. Application with asynchronous replication, while a local host of a storage system on a local site writing a new data set into a source volume, if the original data of the to-be-written block of the source volume is different from the data stored in the corresponding block of the destination volume on a remote site, only a backup-on-write (BOW) operation is performed on the local site for writting the original data into the point-in-time differential backup image (or backup image for short or BAS instead) associated with the source volume. And then, after the new data has been written into the source volume, the local host on the local site is responded that its Host IO request has been completed, rather than waiting for the original data replicated to the destination volume on the remote site synchronously. Alternatively, if the original data of the to-be-written block of the source volume is identical to the data of the corresponding block of the destination volume on the remote site, it is unnecessary to backup-on-write the original data into the Source BAS of the source volume. After the new data has been written into the source volume, the local host is responded that the Host IO request has been completed.

Since the present invention adopts the asynchronous replication to deal with the Host IO request issued from the local host, in other words, after all information and data are processed and transmitted on the local site, the local host is firstly responded that the Host IO request has been completed. The procedure of replicating the data to the destination volume on the remote site is actually executed later during the background copying process or other appropriate timing. Moreover, the data changes of the source volume are backuped by using the point-in-time differential backup technology in the present invention. As aforementioned, only the original data of the source volume that is different from the corresponding one of the destination volume on the remote site is necessarily "backuped-on-write" into the Source BAS of the source volume rather than backuping all data changes into the Source BAS of the source volume, so as to minimize the data amount necessarily transmitted to the destination volume on the remote site. Therefore, according to the present technology, the problem of remote data transmission limited by the network bandwidth can be avoided and the operation performance of the storage system can be kept at a better level.

With reference to FIG. 1, it depicts a diagram of a hardware structure of a computer system according to an embodiment of the present invention. The hardware structure includes a host 11 and a storage virtualization subsystem (SVS) 12, both of which are located on a local site 1 and used to execute a main systemic operation; and it includes a SVS 22 located on a remote site 2 for providing backup support to the SVS 12. The SVS 12 and the SVS 22 are intercommunicated via a communication medium 3. The communication medium 3 may be a Local Area Network (LAN), a Wide Area Network (WAN), a Storage Area Network (SAN), the Internet, or other communication medium such as the Dedicated Data Transfer Channel that enable the SVS 12 and the SVS 22 to intercommunicate with each other. In this embodiment, only one host 11 and one SVS 12 are interconnected on the local site 1, but actual application may be a host 11 connected to plural SVSs 12, plural hosts 11 connected to one SVS 12, or plural hosts 11 connected to plural SVSs 12. Besides, in other embodiments of the present invention, there may be one or more hosts (unshown) connected to the SVS 22 on the remote site 2. The embodiment shown in FIG. 1 assumes that the local site 1 is designated to perform the main systemic operation and the remote site 2 merely serves as a backup so that it is minor to consider the connection between the SVS 22 and any host; however, in another embodiment of the present invention, the remote site 2 may serve as a master of the storage system.

The host 11 located on the local site 1 may be a host computer, for example, a server system, a workstation, a personal computer or the like. The SVS 12 on the local site 1 includes a storage virtualization controller (SVC) 13 and a physical storage device array (PSD array) 14 connecting thereto, and the SVS 22 on the remote site 2 includes a SVC 23 and a PSD array 24 connecting thereto, respectively. The SVC 13 and SVC 23 may be a disk array controller or a Just-Bunch-of-Disks (JBOD) simulator. The figure only depicts one PSD array 14 and one PSD array 24 respectively connected to the SVC 13 and the SVC 23; however, in actual application, there may be one or more PSD arrays 14 and PSD arrays 24 respectively disposed in the SVS 12 and the SVS 22, and the host 11 may also be a storage virtualization controller.

Both of the SVC 13 and the SVC 23 are in charge of receiving an IO request and the related information (for example, the control signal and data signal) sent from the host 11, and executing the IO request or mapping it to the PSD array 14 and PSD array 24, respectively. Each of the PSD arrays 14 and 24 include plural PSDs such as hard disks. The SVCs 13 23 can enhance performance and/or improve data availability, or increase the storage capacity of a single logic medium unit with respect to the host 11.

The volume is a virtualized logic storage unit. In the example of the local site 1, the SVC 13 can virtualize the PSD array 14 into one or more logic storage devices being presented to the host 11 for data accessing. The host 11 can assign the one or more logic storage devices to certain volumes; and each volume has its own file system. One volume may include one or more PSDs, only a partial region of a PSD, or a combination of partial regions of several PSDs. For convenient illustration, either on the local site 1 or the remote site 2, a storage region of a volume is assumed to just cover a PSD in FIG. 1; however, other embodiments of the present invention are not limited herein. As aforementioned, a volume in the present invention may be referred to a partial region of a PSD, one or more PSDs, or a combination of partial regions of several PSDs.

When volumes are being replicated, the whole content of the source volume on the local site must be replicated completely to the destination volume on the remote site; and during the replication of the volumes, the communication medium 3 is needed to transmit data. In the example of FIG. 1, the volume A 15a on the local site may be replicated completely to the volume P 25a on the remote site, or other possible embodiments. In the meanwhile, the volume A 15a serving as a data provider is the source volume, and the volume P 25a serving as a replicated data receiver is the destination volume. The source volume and the destination volume may not have the same capacity; however, in general, the capacity of the destination volume should be larger or equal to the one of the source volume, for containing all data replicated from the source volume.

The implementation of volume replication starts from the step of establishing a relationship of a mirroring pair between a source volume and a destination volume, for example, the volume A 15a and the volume P 25a as aforementioned. The two volumes of the mirroring pair may be located in the same or different storage systems. The present invention is directed to the data replication performed on the mirroring pair of two volumes located in different storage systems. After forming the mirroring pair, there may be several possible embodiments for the following operations. The first possible embodiment is that a first synchronization procedure is carried out for mirroring the source volume to the destination volume. The second possible embodiment is that no synchronization procedure is carried out if no data is stored in the source volume on the local site 1 at the beginning of establishing the mirroring pair. The third possible embodiment is that, the source volume creats a mirroring image of itself on the local site 1 first and then replicates the mirroring image to the destination volume on the remote site 2. With respect to the two volumes located on different sites, a communication medium 3 is needed for achieving the data transmission between the local site 1 and the remote site 2, no matter which embodiment is adopted. According to the requirement of application, the mirroring relationship between the two volumes of the mirroring pair may be terminated at a certain moment set in the period or after the completion of the mirroring process; the termination operation is called "split". If a "split" command is issued, it means that the destination volume needs to reserve the data status of the source volume at the time point of receiving the "split" command; and it also means that after such time point, the is relationship of being a mirroring pair between the source volume and the destination volume is discontinued, and the two volumes can be accessed or updated independently without the need of keeping coincidence of both if changing data.

According to an embodiment of the present invention, the data is replicated asynchronously between the two volumes located on the local site 1 and the remote site 2. Thus, once the relationship of being a mirroring pair is established between the two volumes, the "split" process is executed immediately. After this "split" process, even a "resynchrorous (resync)" procedure is initialized, the "split" process will be executed immediately again for always keeping the split status on the two volumes located on the local site and the remote site. It is understood that, the destination volume located on the remote site 2 is required to replicate the data status of the source volume at the "split" time point. After the split process, the source volume keeps recording the data changes caused by the host 11. However, the data changes are not necessarily synchrinzed to the destination volume on the remote site 2, unless there is a re-synchronization procedure started later.

Figure 2:
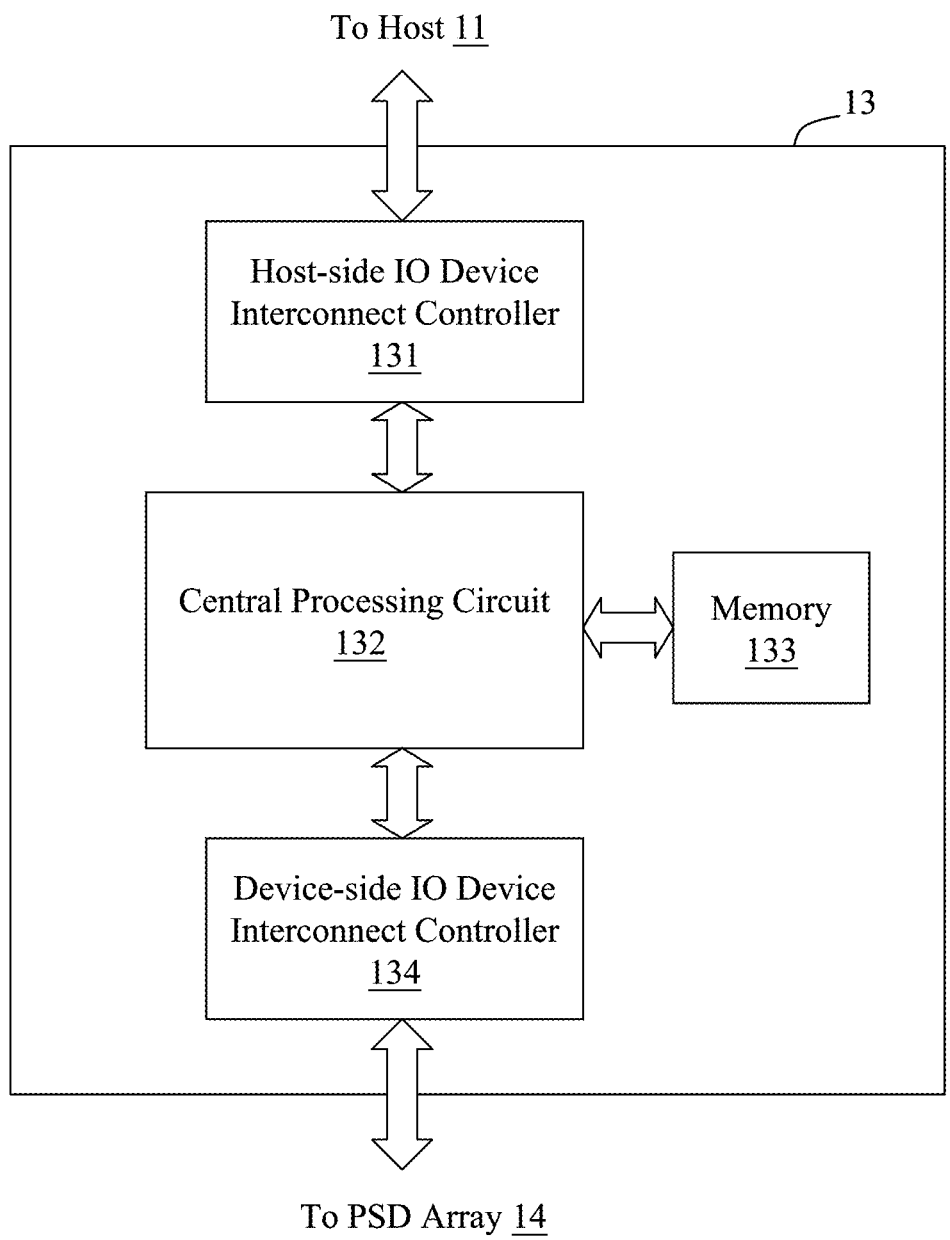
FIG. 2 depicts a diagram of a storage virtualization controller (SVC) according to an embodiment of the present invention.

The method for remote asynchronous replication of volumes disclosed by the present invention is implemented by using the SVC 13 and the SVC 23 of FIG. 1, and the schematic diagram of an embodiment of the SVC is depicted in FIG. 2.

The SVCs 13 and 23 are mostly used to map the combination of the sections of the PSDs into a logic storage device being presented to the host 11. After the SVCs 13 and 23 received a Host IO request sent from the host 11, the Host IO request will be analyzed and interpreted, and then the related commands and data will be compiled into PSD IO requests.

Taking the SVC 13 located on the local site as an example, the SVC 13 includes a host-side IO device interconnect controller 131, a central processing circuit (CPC) 132, a memory 133 and a device-side IO device interconnect controller 134. The aforementioned functional blocks are described separately herein, and however, in the actual application, the partial or whole functional blocks can be integrated onto an individual chip. The SVC 23 located on the remote site also has the above-mentioned structure.

The host-side IO device interconnect controller 131 is connected to the host 11 and the CPC 132 and it serves as an interface and a buffer between the SVC 13 and the host 11. The Host-side IO device interconnect controller 131 can receive IO requests and the related data sent from the host 11 and transform them to the CPC 132.

The memory 133 is connected to the CPC 132 and serves as a buffer, for buffering the data transmitted between the host 11 and the PSD array 14 via the CPC 132. In actual application, the memory 133 can be a dynamic random access memory (DRAM), and the DRAM may be a synchronous dynamic random access memory (SDRAM).

The device-side IO device interconnect controller 134 is located between the CPC 132 and the PSD array 14, and it serves as an interface and a buffer between the SVC 13 and the PSD array 14. The device-side IO device interconnect controller 134 can receive IO requests and the related data sent from the CPC 132, and map and/or send them to the PSD array 14.

The CPC 132 is the computing center of the SVC 13. When the CPC 132 receives the Host IO request sent from the host-side IO device interconnect controller 131, the CPC 132 analyzes the Host IO request and executes some operations for responding this Host IO request. The requested data and/or report and/or information is then sent to the host 11 by the SVC 13 via the host-side IO device interconnect controller 131. The method for remote asynchronous replication of volumes disclosed by the present invention can be implemented in the manner of the programmed code that can be stored in a memory (for example, the ROM but unshown herein) inside the CPC 132 or a memory 133 outside the CPC 132, for being executed by the CPC 132.

The asynchronous replication provided by the present invention can appropriately delay the time point that the data is actually replicated to the destination volume on the remote site, thereby effectively reducing the overhead time responding to the Host IO request. Furthermore, the technology of the point-in-time differential backup is used to backup the original data while the data of the source volume changes, so as to reserve the data status of the source volume at the "split" time point and to replicate the data to the destination volume in appropriate time later. In another embodiment of the present invention, the destination volume on the remote site also has a destination backup-on-write image, or called a Destination BAS instead, for backuping the data status of the destination volume at the "split" time point and for serving a rollback operation of its own data if there is a need.

The implementation of the method for remote asynchronous replication of volumes disclosed by the present invention is illustrated detailed in the following context. The "point-in-time differential backup" technology is introduced generally as follows.

Figure 3:
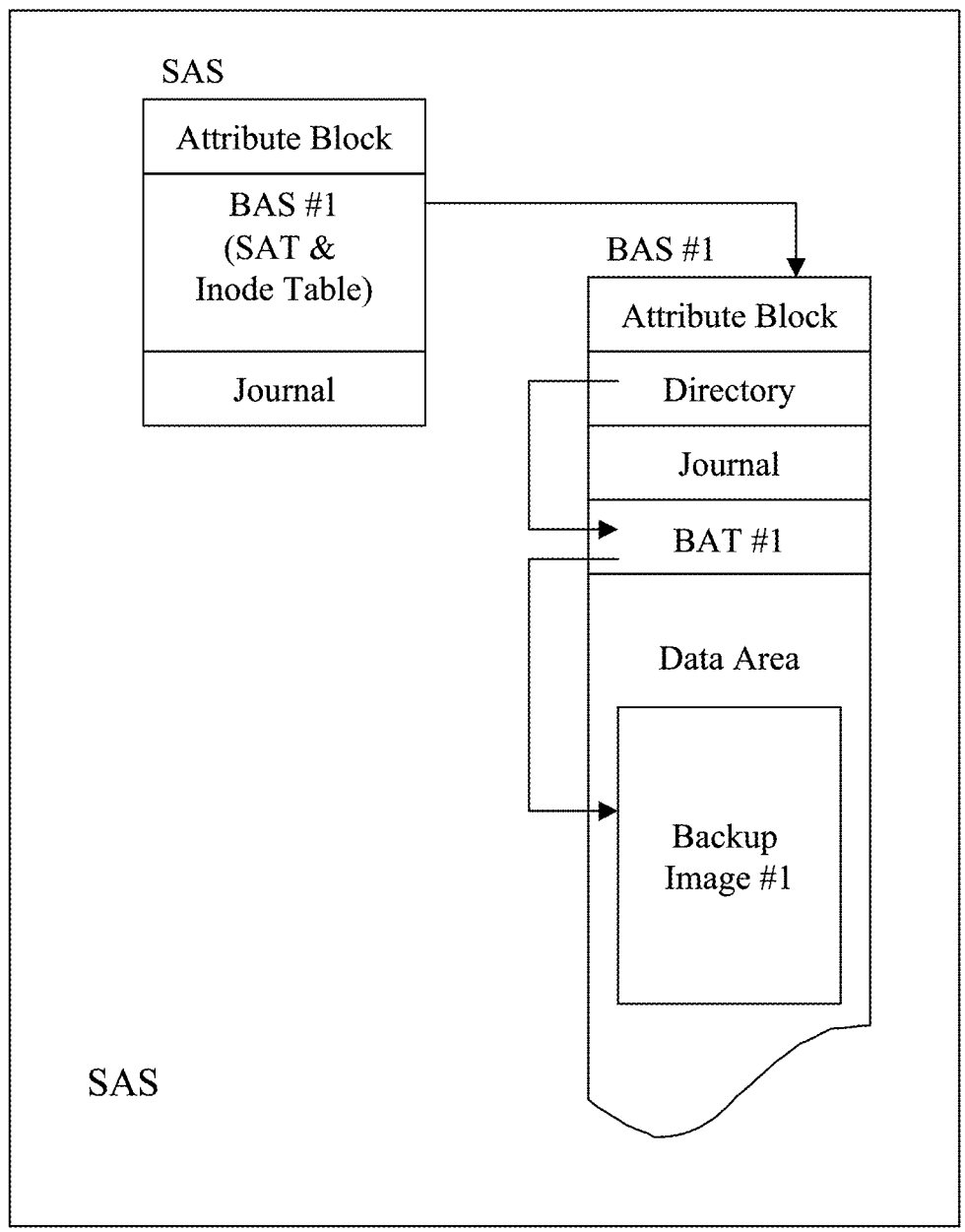
FIG. 3 depicts a diagram of a section allocation system (SAS) used by the "point-in-time differential backup" technology according to an embodiment of the present invention.

Reference is made to FIG. 3. A section allocation system (SAS) is applied in the "point-in-time differential backup" technology for managing the operations of the backup volume. The SAS has a file-system-like structure, which may be consisted of one or more media extents (unshown). Formatting one or more logical drives/partitions which work as media section providers forms those media extents. Each SAS includes its own section allocation table (SAT) and an inode table (unshown). The information with respect to the storage location of the file content, or called the pointer of the file content, is recorded in the inode table, so as to allow the system to obtain the correct file content via the inode table. The SAS and each of its assocated media extents have one unique ID for being identified. The SAS includes an attribute block for recording the SAS ID and the media extent ID; a block association set (BAS) related field for recording the information, including the SAT and the inode table, pointing each block association set (BAS), as well as the information of the source volume associated with each BAS; and a journal field for storing the operating journal so as to provide a recovery while an error or the power failure occurs in the system.

SAS may include one or more BASs, in which the BASs are the foundation of performing a point-in-time (PIT) backup. One or more block association tables (BAT) are stored in the BAS. The BAT serves as storing the information of cross-references corresponding to the backup data having Logical Block Addressing (LBA); in other words, each BAT has an information recorded therein for directing to the corresponding PIT differential backup image. The PIT differential backup image is also stored in the BAS.

In general, each BAS includes an attribute block for recording information with respect to the BAS ID, the BAS size, the BAS-related settings and so on; a directory for recording BAT levels and the numbers of the BATs that have been established; a journal for storing the operating journal so as to provide a recovery while an error or the power failure occurs in the system; a folder table for pointing the BAT(s); and a data area for storing the backup image(s).

Typically, the way of establishing a PIT backup of a logical media (for example, LD/LV/partition) is firstly to set up the SAS on an independent and availabe logical media. Next, the BAS should be set up and installed, and the source volume associated with the BAS is mapped to the ID/LUNs of one or more host channels. Later, at the moment of making the PIT backup, a corresponding BAT should be set up and the BAT is assigned to be the active BAT of the BAS. Before a certain data block of the source volume associated with the BAS is being changed, the "backup-on-write (BOW)" procedure is activated, and the original data of the block is replicated to the corresponding block of the PIT differential backup image of the active BAT.

The aforementioned SAS, BAS, and BAT, as well as the functions and interactions of and between each fields and data areas, are well known by the skilled persons in the art, thereby no further descriptions recited in detail hereinafter.

Figure 4A:
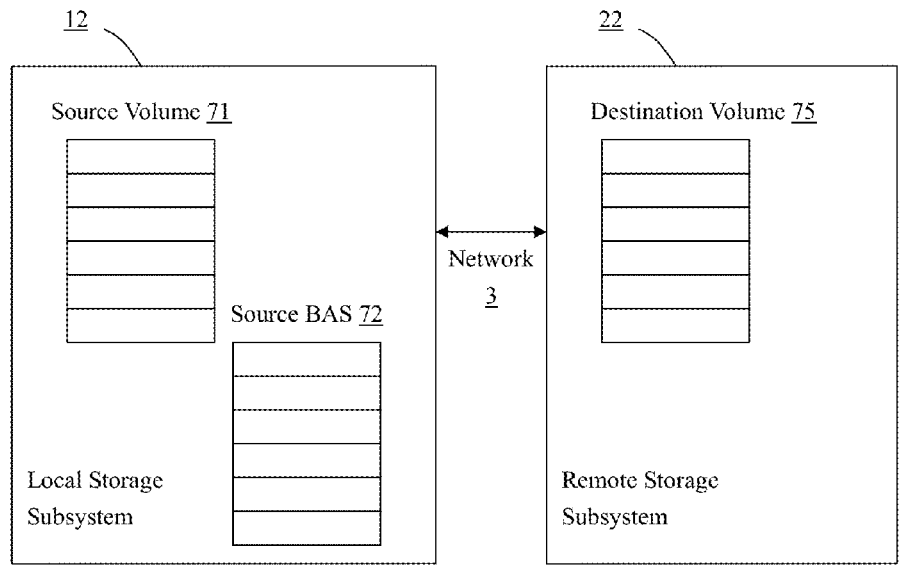
FIG. 4A depicts a diagram of volume structures on the remote site and the local site using the "point-in-time differential backup" technology according to a first embodiment of the present invention.

Reference is made to FIG. 4A. In the beginning of the asynchronous replication of the Source Volume 71 in a local storage subsystem 12 to the Destination Volume 75 in a remote storage subsystem 22, the PIT differential backup information of the Source Volume 71, or called the Source BAS 72 exemplified in FIG. 4A, is set up and includes a BAT at the split time point and its corresponding storage space required by the PIT differential backup image in the local storage subsystem 12. Although the Source BAS 72 is recited to represent the PIT differential backup information of the Source Volume 71 in this context hereafter, however in fact, as aforementioned, the information required for carrying out the BOW operation further includes its corresponding SAS, BAS and the information of the relative fields. Since the PIT differential backup image of the Source Volume 71 only records a backup image at the split time point according to the present method, there is only one Source BAS 72 for recording the data status of the Source Volume 71 at the split time point.

Figure 4B:
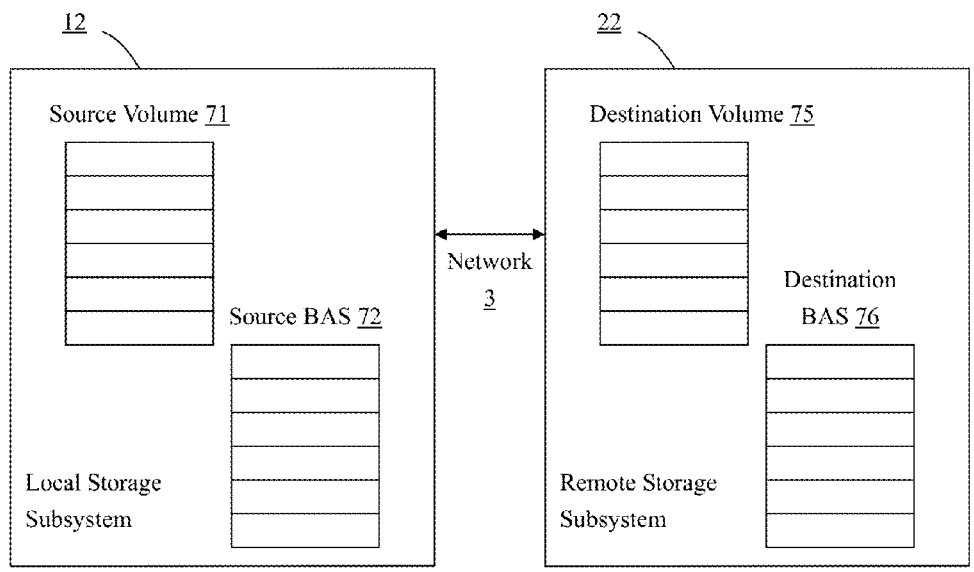
FIG. 4B depicts a diagram of volume structures on the remote site and the local site using the "point-in-time differential backup" technology according to a second embodiment of the present invention.

Reference is made to FIG. 4B. According to another embodiment in the present invention, in the beginning of the asynchronous replication, a PIT differential backup information of the Destination Volume 75, or called the Destination BAS 76 exemplified in FIG. 4B, is also set up and includes a BAT at the split time point and its corresponding storage space required by the PIT differential backup image in the remote storage subsystem 22. When the data of the Source Volume 71 or the Source BAS 72 is being written into the Destination Volume 75, the Destination BAS 76 may serve as backuping the data status of the Destination Volume 75 at the split time point, so as to reserve the original data of the Destination Volume 75 for a "rollback" operation while there is a need. Although the Destination BAS 76 is recited to represent the PIT differential backup information of the Destination Volume 75, however in fact, as aforementioned, the PIT differential backup information further includes its corresponding SAS, BAS and the information of the relative fields. In this embodiment, each of the Source Volume 71 and the Destination Volume 75 has one source BAS 72 and one Destination BAS 76, respectively, for recording the PIT differential backup image at the split time point.

Figure 5A:
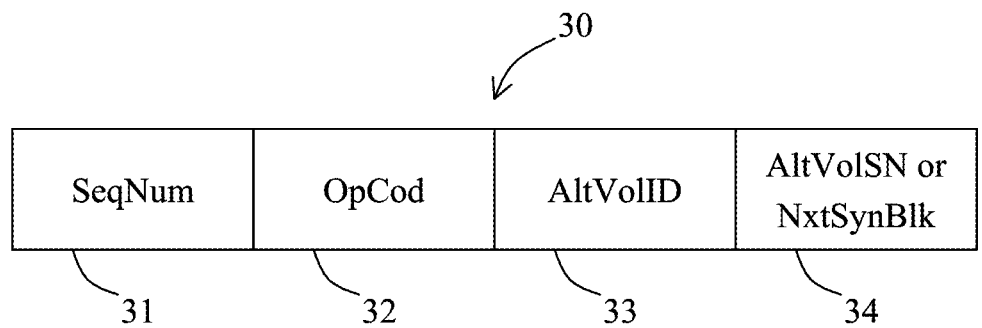
FIG. 5A depicts a data structure of a volume log table (VLT) for recording the information of the volume replication.
Figure 5B:
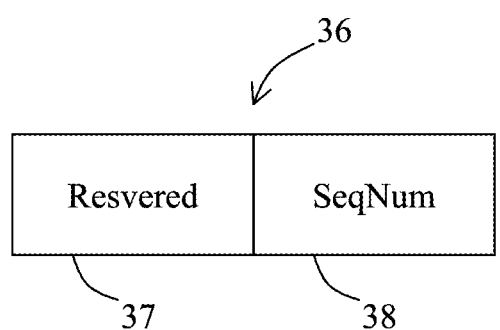
FIG. 5B depicts a data structure of a volume block update table (VBUT) for recording the in formation of the volume replication.

Reference is made to FIGS. 5A and 5B. In order to record the mutual status and their own block information of the Source Volume 71 and the Destination Volume 75 during the period of the replication of the two volumes, at the time of the Source Volume 71 and the Destination Volume 75 forming a mirroring pair, each of the two volumes 71 and 75 establishes a dedicated volume log table (VLT) 30 and a dedicated volume block update table (VBUT) 36, in which the VLT 30 is used to record the synchronous status information between the two volumes 71 and 75, and the VBUT 36 is used to record the updated status information of each data block of such volume.

FIG. 5A shows the fields of an entry of the VLT 30 as a representative example. In actual operations, one VLT 30 may include one or more VLT entries. Whenever the owner of the VLT 30 establishes a new relationship with any of other volumes or makes a status change, a new VLT entry will be created accordingly. One VLT entry includes four fields. The first field 31 records a sequence number (SeqNum). The second field 32 records an operating code (OpCod). The third field 33 records the alternative volume's ID (AltVolID) in which the alternative volume is associated with the owner of the VLT 30. The fourth field 34 records either VLT entry's sequence number (AltVolSN) of the alternative volume associated with the owner of the VLT 30, or the index (NxtSynBlk) of the next synchronized data block of itself. The four fields arranged in the above order is merely an embodiment of the present invention, and in other embodiments, the four fields can be in other order. Any other embodiments with the information of the four fields completely recorded are deemed to be within the scope or spirit of the invention. The detail of the four fields is described as follows.

In the beginning of establishing each VLT entry, the sequence number (SeqNum) in the first field 31 is an initial setting value. In the example of the Source Volume 71, the initial setting value may be "0 (null)", which shows that the Source Volume 71 owning the VLT 30 has not split off from the Destination Volume 75 recorded in the third field 33. However, according to an embodiment of the present method, the split process executes immediately in the beginning of the two volumes 71 and 75 forming a mirroring pair. In the meanwhile, a Master Sequence Number (MstSN) variable assigns a new sequence number (SeqNum) right away. For example, if the initial setting value is "0 (null)", the Master Sequence Number (MstSN) variable is accumulated from "1"; in other word, the SeqNum of the VLT entry firstly into the split status is "1", the SeqNum of the VLT entry secondly into the split status is "2", and so on. In brief, as long as the value in the first field 31 of the VLT entry is not "0", it means that the Source Volume 71 owning the VLT 30 has split off from the Destination Volume 75 recorded in the third field 33; on the contrary, if the value in the first field 31 of the VLT entry is "0", it means that the two volumes are not split off from each other yet.

If the VLT owner is the Destination Volume 75, the initial setting value of the SeqNum in the first field 31 of the VLT entrycan be "1" and it means that the VLT entry is associated with the first replication event. Afterwards, the value of the SeqNum is also assigned by an MstSN variable whenever a following replication event occurs; the MstSN variable may be accumulated from "2". It is determined whether the Destination Volume 75 is split off from the Source Volume 71 or not according to the second field 32 of its VLT entry, and it is nothing to do with the SeqNum in the first field 31.

In other embodiments, the initial setting value of the SeqNum in the first field 31 of the VLT entry of the Source Volume 71 or the Destination Volume 75 may be set as any of other numbers. Moreover, the accumulated offset of the MstSN variable may be not "1" as well. For example, the initial setting value may be set as "2", the accumulated offset of the MstSN variable may be set as "2", and the following SeqNum in the first field 31 of the VLT entry may be assigned as 2, 4, 6 and so on by the MstSN variable sequentially. It should be noted that, if the initial setting value of the SeqNum in the first field 31 of the VLT entry of the Source Volume 71 is not "0 (null)", it is based on whether the sequence number (SeqNum) is the initial setting value or not to determine whether the source volume 71 has entered a split state or not. For example, if the initial setting value is set as "1", the SeqNum equal to "1" shows that the Source Volume 71 has not split off from the Destination Volume 75 yet; after being split, the SeqNum of the VLT entry is assigned by the initial setting value plus an offset.

The present invention provides three definitions of the OpCod in the second field 32 of the VLT entry , indicating three different statuses of the volume as listed below.

"SYNSRC" represents that the volume serving as a "source volume" in the synchronous relationship of two volumes;

"SYNDST" represents that the volume serving as a "destination volume" in the synchronous relationship of two volumes; and "SYNSPL" represents that the destination volume has split off from the source volume.

The above three kinds of OpCods also affect the content recorded in the fourth field 34 of the VLT 30. If the second field 32 of the VLT entry has the OpCod of "SYNSRC" or "SYNSPL", the fourth field 34 of the same VLT entry records the alternative volume sequence number (Alt- VolSN), which is the sequence number of an entry in the VLT of the alternative volume associated with this VLT owner. If the second field 32 of the VLT entry has the OpCod of "SYNDST", the fourth field 34 of the same VLT entry records the next-sync-block index (NxtSynBlk) of the VLT owner itself, which is the next data block to be synchronized.

It should be noted that, although the above paragraphs use "SYNSRC", "SYNDST" and "SYNSPL" to represent three states of a volume as being "a source volume", "a destination volume" and having been "split" at a specific moment, yet the present invention is not limited thereto. In other embodiments, the above three states may be represented by other codes.

FIG. 5B shows a representative example of fields of an entry of the VBUT 36. In actual operation, one VBUT 36 may include plural VBUT entries. Each VBUT entry is referred to a data block of the volume that the VBUT entry associated with; in other words, the data blocks of the volume correspond to the VBUT entries of the VBUT 36 in quantity. One VBUT entry may include two fields of the first field 37 and the second field 38. The first field 37 is a reserved field. The second field 38 records a sequence number (SeqNum) of the associated VLT entry, in which the data of the data block associated with the VBUT entry is updated according to the event represented by the sequence number (SeqNum) of the VLT entry, so as to track the status of each data block of the volume, for example, whether the data block has synchronized or not, or whether the data block has any data change due to the access of the host 11 after the synchronization. The data length of one VBUT entry may be 32 bits or other appropriate length. In other embodiment, one VBUT entry may contain other number of fields in addition to two, and may only contain a second field 38 if simplification is considered.

The following principles are needed to be noticed while performing volume replication between two volumes by using the VLT 30 and the VBUT 36.

The first principle: a volume that is involving a synchronous replicating operation (sync operation) cannot be designated to be a destination volume of another synchronous replicating operation. In other words, if the volume that is involving a synchronous replication operation needs to be the destination volume of another synchronous replication operation, the performing synchronous replication operation has to be stopped first and the volume needs to be split off from the original mirroring pair, and then the volume can be designated to be the destination volume of another synchronous replication operation.

The second principle: an unsplit destination volume which is participating a synchronous replication operation cannot be presented alone to the host for accessing data; only the source volume can be the access target to the host. Due to such characteristic, if the destination volume is temporarily off line, it can return to be on line and continue the synchronous replication operation with the original synchronous configuration (sync configuration). Based on the same reason, since the destination volume cannot be a single target for the Host IO request, it cannot be the source volume of another synchronous replication operations unless the destination volume has been split.

The third principle: during the period of a synchronous replication operation and before the source volume and the destination volume are split off from each other, if a "re-synchronization (Resync)" operation is activated and performed on the two volumes, the two volumes must be immediately split off from each other through the following steps: setting the sequence number of the VLT entry of the source volume as an up-to-date sequential number, and adding a "SYNSPL entry" to the VLT of the destination volume. And then, the "resynchronization (Resync)" operation can be performed.

The fourth principle: during the period of a synchronous replication operation and before the two volumes are split off from each other, if the destination volume is off line and meanwhile the source volume has a data change due to a Host IO request and the updated blocks have been synchronously replicated, the two volumes must be immediately split off from each other through the following step: setting the sequence number of the VLT entry of the source volume as an up-to-date sequence number. When the destination volume returns to on line, the sequence number (SeqNum) field 31 of the VLT entry of the source volume will be checked. If the field 31 is not the initial setting value such as "0 (null)", the destination volume will be recorded as "split" through the following step: adding a "SYNSPL entry" to the VLT of the destination volume. Thereafter, the resynchronization (Resync) operation can be re-activated for resynchronizing the data of the two volumes.

The fifth principle: during the period of a synchronous replication operation and after the time point that the two volumes are split off from each other, if the source volume has data changes but cannot copy the original data of the updated data blocks to the destination volume, an error bit will be set on the latest "SYNSRC entry". In this situation, if the current synchronous replication operation is unfinished, any attempt to perform the resynchronization (Resync) operation will be prohibited until the current synchronous replication operation is finished. However, the aforementioned step of setting an error bit on the VLT entry of the source volume is only an embodiment of the present invention, and in other embodiments, the error bit may be set on the VLT entry of the destination volume, or independently stored in another recording table.

Prior to clarify how to implement the detailed process of the present method, the definitions of some specific codes are explained as follows.

DstMstSN—a variable of the Master Sequence Number of the destination volume;

SrcMstSN—a variable of the Master Sequence Number of the source volume;

DstVBUT—a VBUT entry corresponding to the data block of the destination volume in processing;

SrcVBUT—a VBUT entry corresponding to the data block of the source volume in processing;

DstVLT—a VLT entry of the destination volume in processing; and SrcVLT—a VLT entry of the source volume in processing.

Reference is made to FIGS. 6A to 6E, which depict a flow chart of the remote asynchronous replication (Remote Async Replication) of the Source Volume 71 to the Destination Volume 75 according to an embodiment of the present invention. This embodiment also considers the structures depicted in FIGS. 4A and 4B. The process of FIGS. 6A to 6E is described with reference to FIGS. 4A, 4B, 5A and 5B.

Figure 6A:
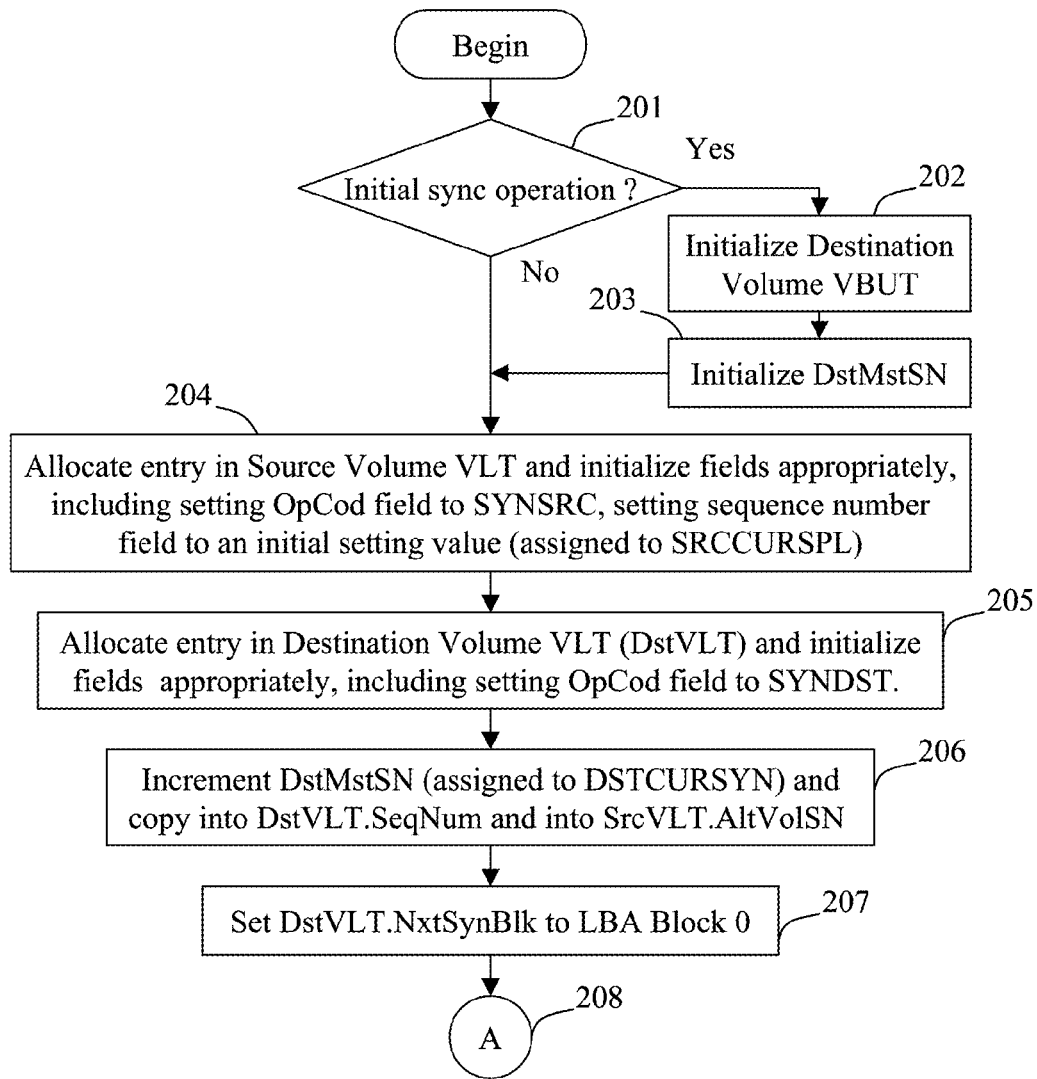
FIGS. 6A to 6E depict a flow chart of the remote asynchronous replication (Remote Async Replication) of the source volume to the destination volume according to an embodiment of the present invention.

In the process of FIG. 6A, it is firstly performed to determine whether the operation is an initial synchronous operation (initial sync operation) or not (step 201). If the determination result of step 201 is "yes", the VBUT 36 of the Destination Volume 75 is initialized (step 202) and the DstMstSN variable of the Destination Volume 75 is initialized (step 203). The way of initialization is to set each entry of the VBUT 36 and the DstMstSN variable to be equal to an initial setting value, respectively. In an embodiment, the initial setting value may be "0 (null)". However, in other embodiments, the initial setting value may be other possible values.

If the determination result of step 201 is not a initial sync operation or after steps 202 and 203, step 204 is performed to allocate an entry (SrcVLT) in the VLT 30 of the source volume 71 and initialize the fields thereof appropriately, including setting the OpCod of the second field 32 to "SYNSRC", and setting the sequence number of the first field 31 to an initial setting value such as "0 (null)". In addition, the initial setting value of the sequence number is further assigned to a first variable which is referred to as a "SRCCURSPL" variable in this embodiment. Next, step 205 is performed to allocate an entry (DstVLT) in the VLT 30 of the Destination Volume 75 and initialize the fields of the DstVLT appropriately, which includes setting the operation code (OpCod) of the second field 32 as "SYNDST". Then, step 206 is performed to add one unit to the value of the DstMstSN variable and copy the value of the DstMstSN variable to the first field 31 of the DstVLT (shown as DstVLT.SeqNum) and to the fourth field 34 (shown as SrcVLT.AltVolSN). In addition, the current value of the DstMstSN variable is assigned to a second variable which is referred to as "DSTCURSYN" variable in this embodiment. Afterwards, step 207 is performed to set the fourth field 34 of the DstVLT (shown as DstVLT.NxtSynBlk)to the block index 0, standinf for a data block of which the LBA (Logical Block Addressing) index is 0.

Figure 6B:
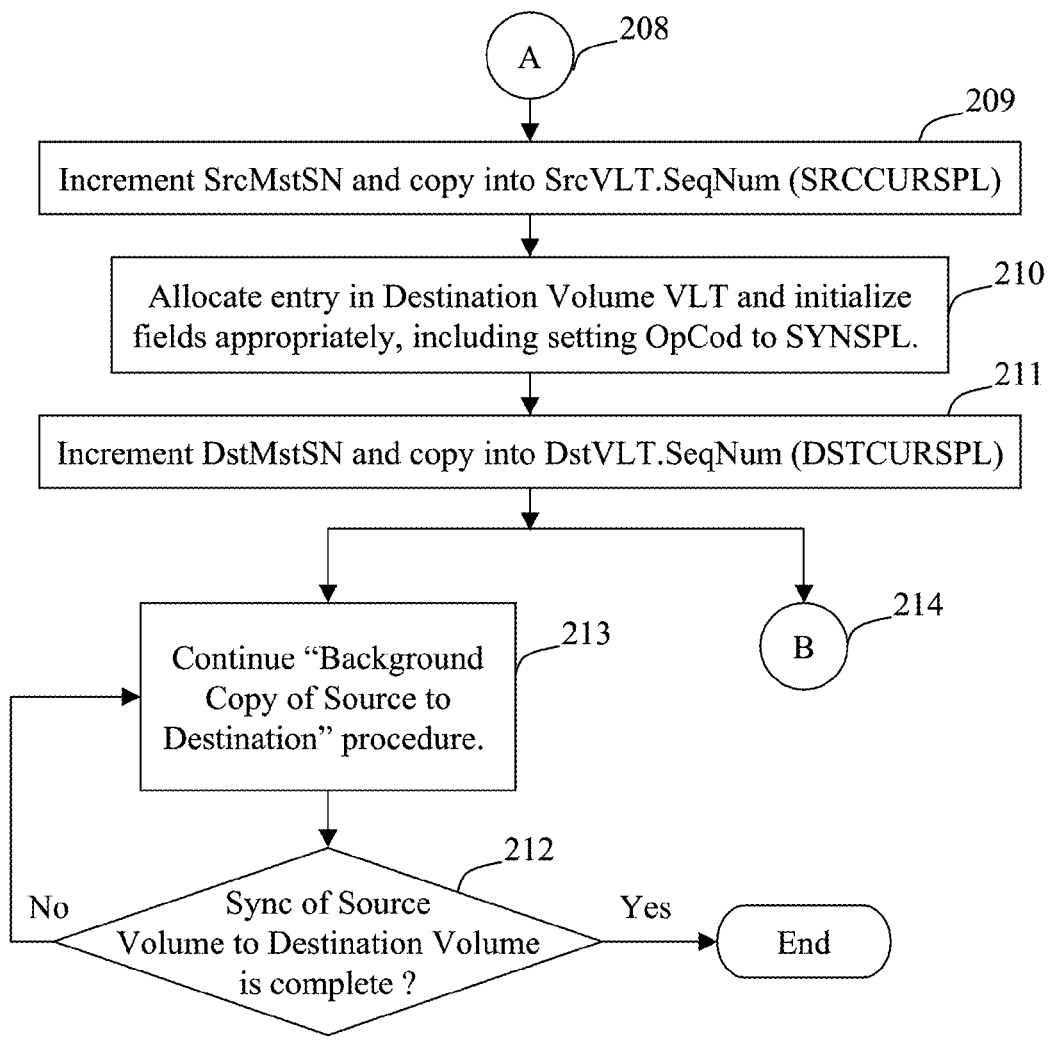

After completion of the above steps, the process is entered into FIG. 6B via the join point A 208. Since the relationship between the Source Volume 71 in the local cite and the Destination Volume 75 in the remote cite is always set to be splitaccording to the present invention, the synchronous (sync) replication process between the Source Volume 71 and the Destination Volume 75 after the join point A 207 is performed in the split condition of the two volumes. In FIG. 6B, firstly the value of the SrcMstSN is added by 1 unit and copied to the first field 31 of the VLT of the Source Volume 71 (SrcVLT.SeqNum). In addition, the current value of the SrcMstSN is assigned to the aforementioned first variable "SRCCURSPL" (step 209). Next, step 210 is performed to allocate an entry (DstVLT) in the VLT 30 of the Destination Volume 75, and to initialize its fields appropriately, which includes setting the operation code (OpCod) of the second field 32 to "SYNSPL". And then, the step 211 is performed to add the value of the DstMstSN variable by one unit and to copy the value of the DstMstSN variable into the first field 31 of the DstVLT (DstVLT.SeqNum). In addition, the current sequence number of the DstMstSN is assigned to a third variable (referred to as "DSTCURSPL" in this embodiment). It should be noted that, the value of the DstMstSN variable has been assigned to the second variable "DSTCURSYN" in step 206 of FIG. 6A before entering step 211 adding the value by one unit, so that the value of the third variable (DSTCURSPL) has a difference of one unit from the value of the second variable (DSTCURSYN). After the completion of the above steps, two procedures are performed in parallel, including the procedure of "Background Copy of Source to Destination" (described in detail later) and the procedure after entering a join point B 214 which is activated by the appearance of a Host IO request (described by FIGS. 6C to 6E in detail later).

The "Background Copy of Source to Destination" procedure called by step 213 is mainly executated an operation for copying the data of the source volume to the destination volume in a background environment. During the period of operation of the background copy procedure, step 212 is consistently performed to determine whether the synchronization operation of the source volume to the destination volume is complete or not. If the determination result of step 212 is "yes", the process flow for the background copy goes to the end; if the determination result of step 212 is "no", the procedure of "Background Copy of Source to Destination" (step 213) is continuously performed until the determination result of step 212 is "yes" and then the process flow for the background copy goes to the end.

Figure 6C:
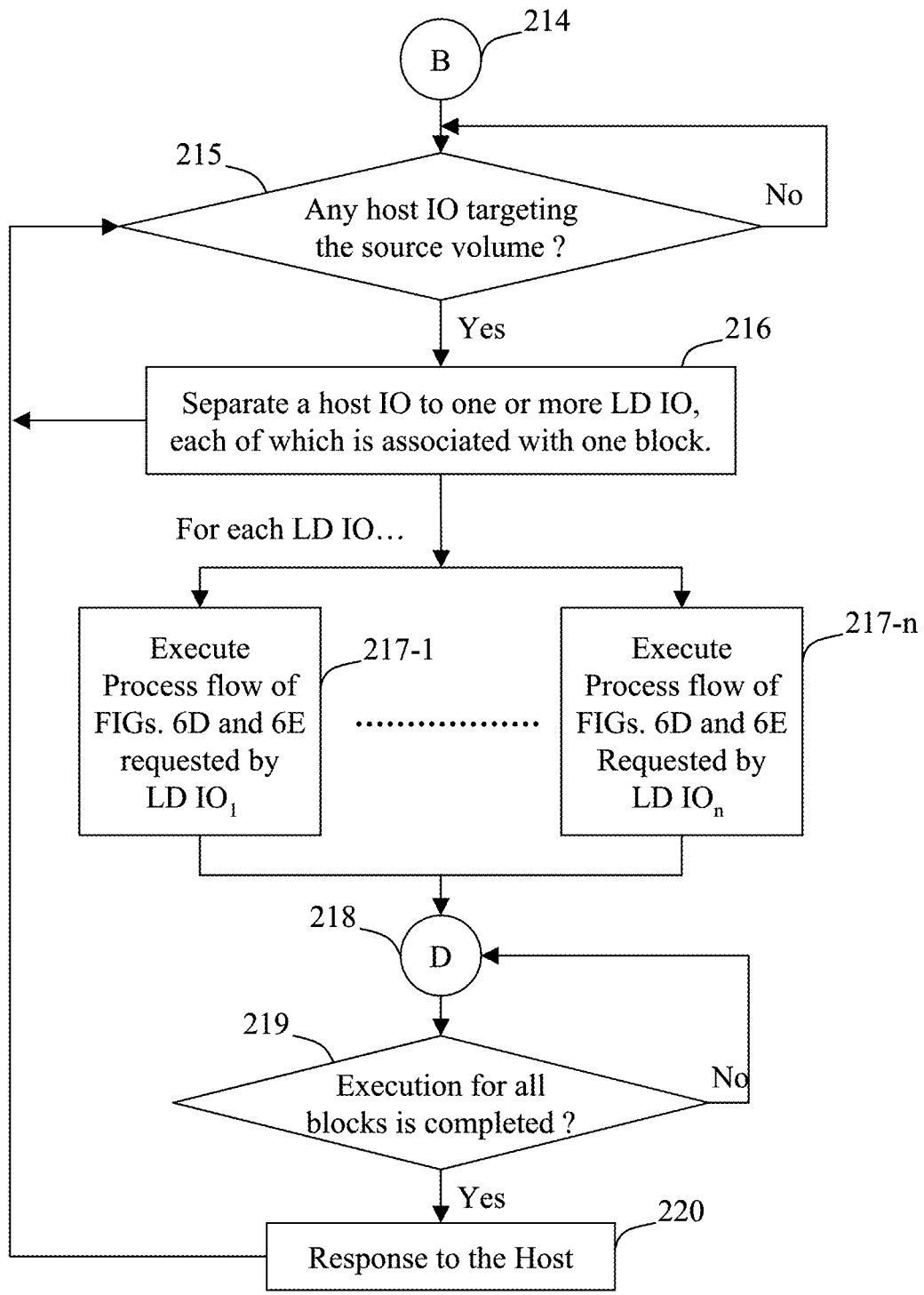

Reference is made to FIG. 6C. After entering this process from the join point B 214, step 215 is performed to inquire if there is any Host IO request targeting the Source Volume 71 for accessing data. If the determination result of step 215 is "no", the process stays in the inquiry state of step 215. If the determination result of step 215 is "yes", the process proceeds to step 216. In step 216, the Host IO request is parsed and divided into one or more logical drive IO (LD IO) requests, each of which is targeting a to-be-accessed data block of the Source Volume 71. Thereafter, the process flow is divided into two directions, one of which returns to step 215 and continuously determine if there is any Host IO request targeting the Source Volume 71 or not, and the other one of which executes the process of FIGS. 6D and 6E simultaneously and in parralell requested by each of the LD IO requests (step 217). For example, if there are n number of LD IO requests (LD $IO_1$ . . . LD $IO_n$) going to access n number of data blocks of the Source Volume 71, it will trigger n number of the process flows of FIGS. 6D and 6E (i.e. steps 217-1 . . . 217-n) executated simultaneously. Whenever the process flow associated with any one of the LD IO requests is complete, step 219 is entered and performed to determine whether all the parallel processes (steps 217-1 . . . 217-n) are complete or not. If the determination result of step 219 is "no", the process flow returns to a join point D 218 and stays at the inquiry state of step 219; if the determination result of step 219 is "yes", the host 11 is responded that the Host IO request is completed (step 220). And then, the process flow returns to step 215 to continuously determine if there is any other Host IO request targeting the Source Volume 71 or not.

It should be noted that, in FIG. 6C, as long as a Host IO appears to access data from the Source Volume 71, the Host IO request is immediately processed by entering the process flow via step 215, no matter whether the previous Host IO request(s) is(are) completed or not.

Figure 6D:
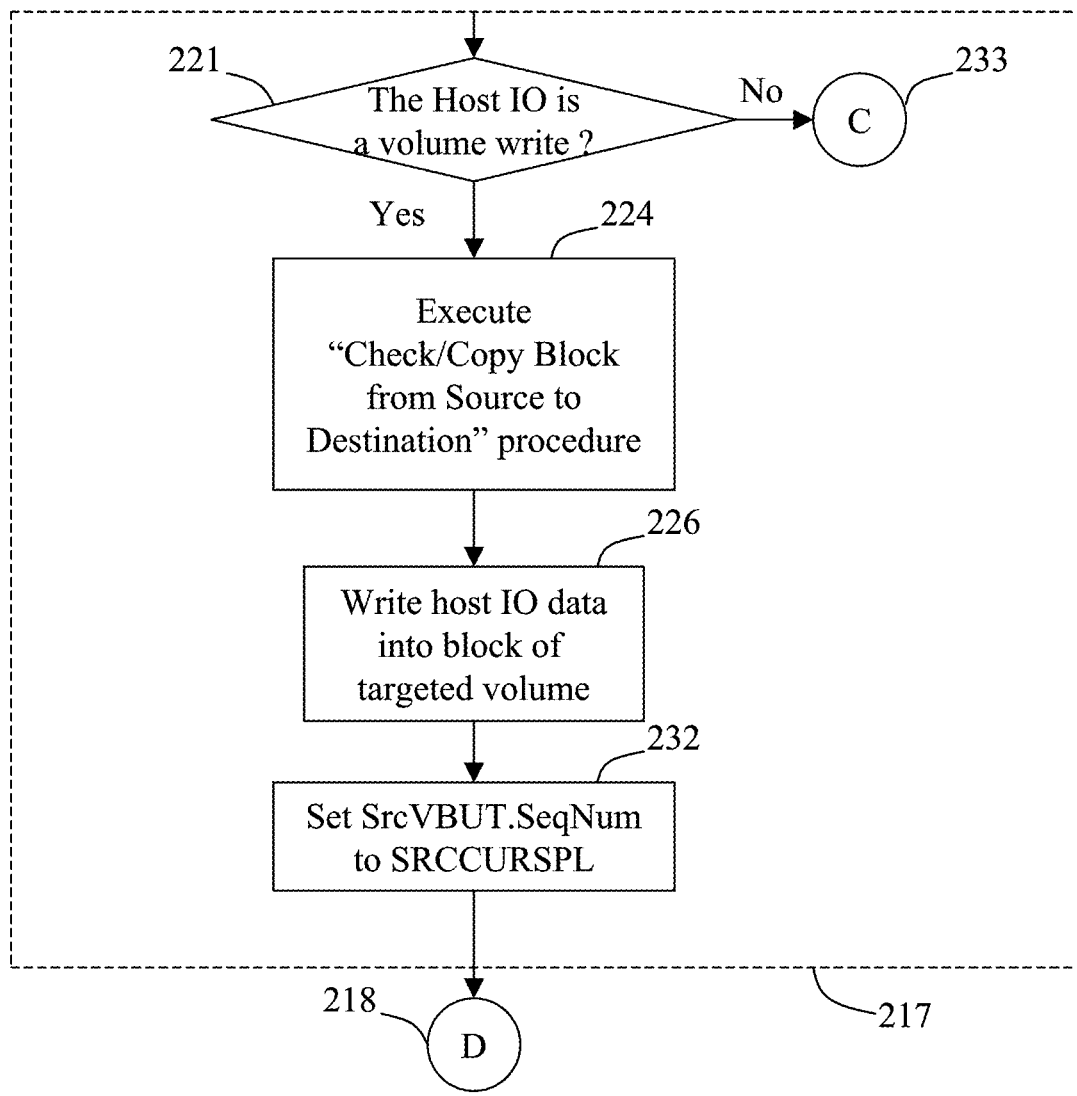
Figure 6E:
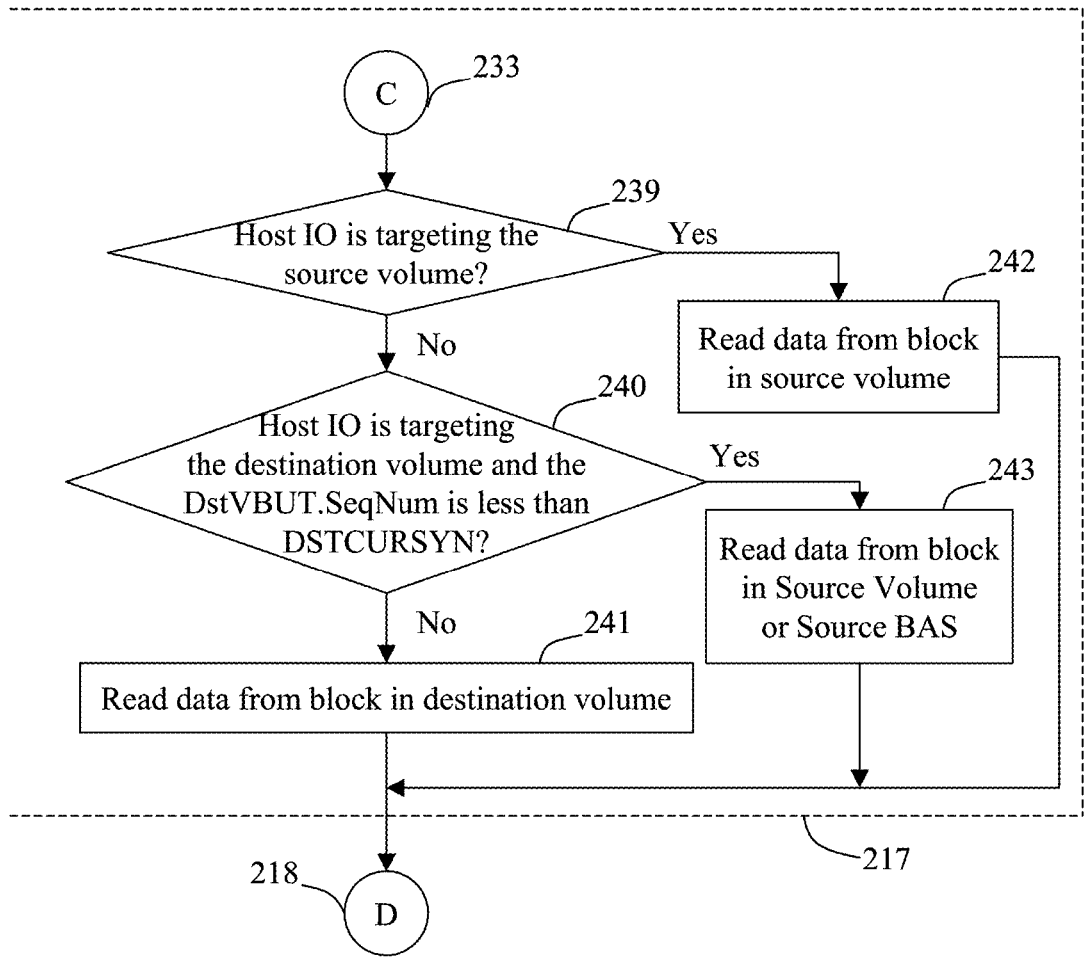

Reference is made to FIGS. 6D and 6E, which together show a procedure for accessing a data block associated with one of the LD IO requests. The procedure shown in FIGS. 6D and 6E is equivalent to a processing block of step 217 in FIG. 6C. FIG. 6D depicts a data-writing process due to a Host IO request, and FIG. 6E depicts a data-reading process due to a Host IO request. Firstly, step 221 of FIG. 6D is perform to determine whether the Host IO request is intending to write data into the Source Volume 71 or not. If the determination result of step 221 is "no", it means that the Host IO request is intending to read data, so the procedure enters the process flow of reading data shown in FIG. 6E by a join point C 233. The process flow of FIG. 6E will be described later. If the determination result of step 221 is "yes", it means that the Host IO request is intending to write data, and then step 224 is performed to call and execute the "Check/Copy Block from Source to Destination" procedure (step 224), for checking and determining if it is necessary to copy the original data of the data block, which is currently processed, of the Source Volume 71 to the corresponding one of the Source BAS 72 as a backup-on-write operation. The details of the "Check/Copy Block from Source to Destination" procedure called due to the Host IO request is described in FIG. 8A later. After step 224, step 226 is performed to write the data to be written by the Host IO request (Host IO data) into the targeted data block of the Source Volume 71.

After step 226, the value of the first variable (SRCCUR-SPL) is assigned to the SrcVBUT.SeqNum (step 232), meaning that the data in the modified data block of the Source Volume 71 is updated in the event represented by the value of the SRCCURSPL. Thereafter, the process flow of FIG. 6D goes to the end and returns to FIG. 6C via the join pont D 218, and then step 219 is enter to perform the determination.

If the determination result of step 221 is "no", the process flow goes to FIG. 6E via the join point C 233 for reading data. At first, step 239 is performed to determine if the host IO request is targeting the Source Volume 71 for reading data. If the determination result of step 239 is "yes", step 242 is performed to read the data from the data block of the Source Volume 71, and then the process flow goes to the end and returns to FIG. 6C via the join point D 218. If the determination result of step 239 is "no", step 240 is performed to further determine if the Host IO request is targeting the Destination Volume 75 and if the DstVBUT.SeqNum (standing for the sequence number of the VBUT entry, which is currently processed, of the destination volume) is less than the value of the second variable (DSTCURSYN). If the determination result of step 240 is "yes", it means that the to-be-read data in the data block of the Destination Volume 75 is not synchronized with the corresponding data block of the Source Volume 71 yet. Thus, the process flow goes to step 243 to read the data from the corresponding data block in the Source Volume 71 or the Source BAS 72. If the determination result of step 240 is "no", it means no above doubt. Thus, step 241 is performed to directly read the data from the data block of the Destination Volume 75 (step 241). Then the process flow goes to the end and returns to FIG. 6C via the join point D 218.

Figure 7:
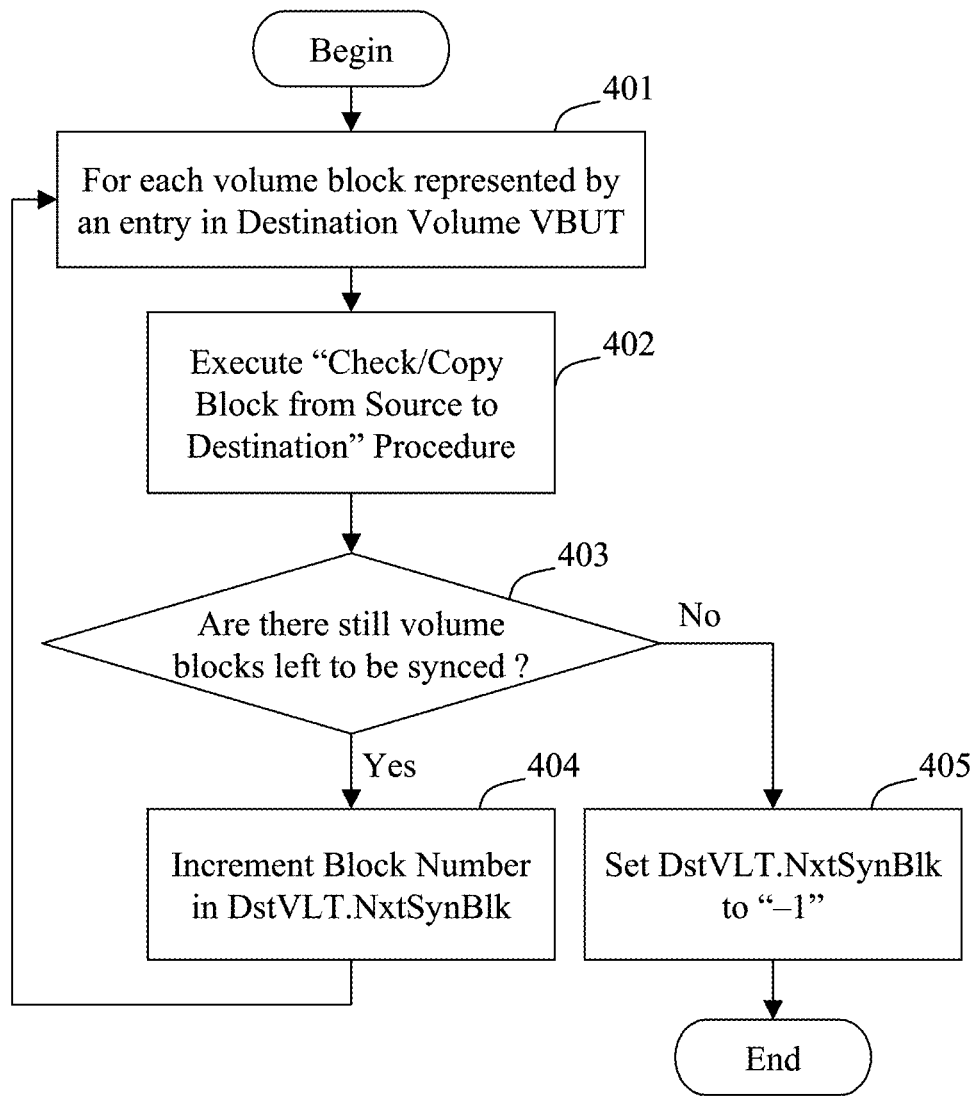
FIG. 7 depicts a flow chart of a background copy of the source volume to the destination volume (Background Copy of Source to Destination Volume) process according to an embodiment of the present invention.

Reference is made to FIG. 7, which depicts a flow chart of a background copy of the source volume to the destination volume ("Background Copy of Source to Destination Volume" procedure) according to an embodiment of the present invention. This procedure is called by step 213 shown in FIG. 6B. For each data block represented by a VBUT entry of the destination volume (step 401), step 402 is performed to call and execute a procedure of checking/copying data blocks from the source volume to the destination volume ("Check/Copy Block from Source to Destination" procedure). The details of the "Check/Copy Block from Source to Destination" procedure called by the background copy process is shown in FIG. 8B and will be described later. After step 402 is complete, step 403 is performed to determine if there are still other data blocks left to be replicated synchronously. If the determination result of step 403 is "yes", the block number of the DstVLT.NxtSynBlk (standing for the index of the next data block to be synchronously replicated (NxtSynBlk) recorded in the fourth field 34 of the VLT, which is currently processed, of the destination volume) is added by 1 unit (step 404), and then the procedure returns to step 401 to perform another round of steps 402 to 403 for the next data block. If the determination result of step 403 is "no", the value of the DstVLT.NxtSynBlk (standing forthe index of the next data block to be synchronously replicated (NxtSynBlk) recorded in the fourth field 34 of the VLT, which is currently processed, of the destination volume) is set to "−1" (step 405), meaning that the synchronous replication of all data blocks are complete, and the procedure goes to the end. It should be noted that, setting the value of the DstVLT.NxtSynBlk to "−1" is merely an embodiment of the present invention. However, in other embodiments, any expression using a proper numerical value to achieve the equivalent effect should fall within the scope or the spirit of the present invention, for example, setting the value of the DstVLT.NxtSynBlk to "−2".

Figure 8A:
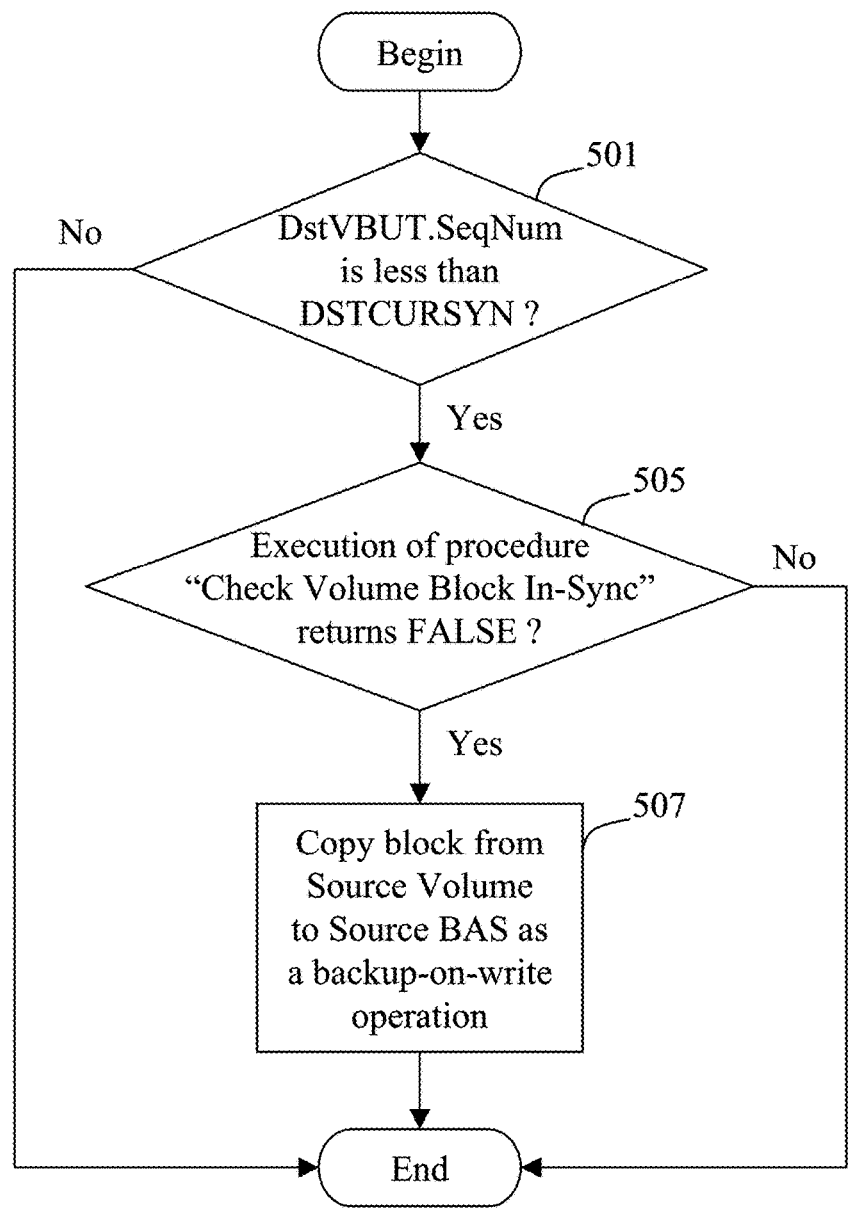
FIG. 8A depicts a flow chart of "Check/Copy Block from Source to Destination Volume" procedure called by the process of dealing with the Host IO according to an embodiment of the present invention.
Figure 8B:
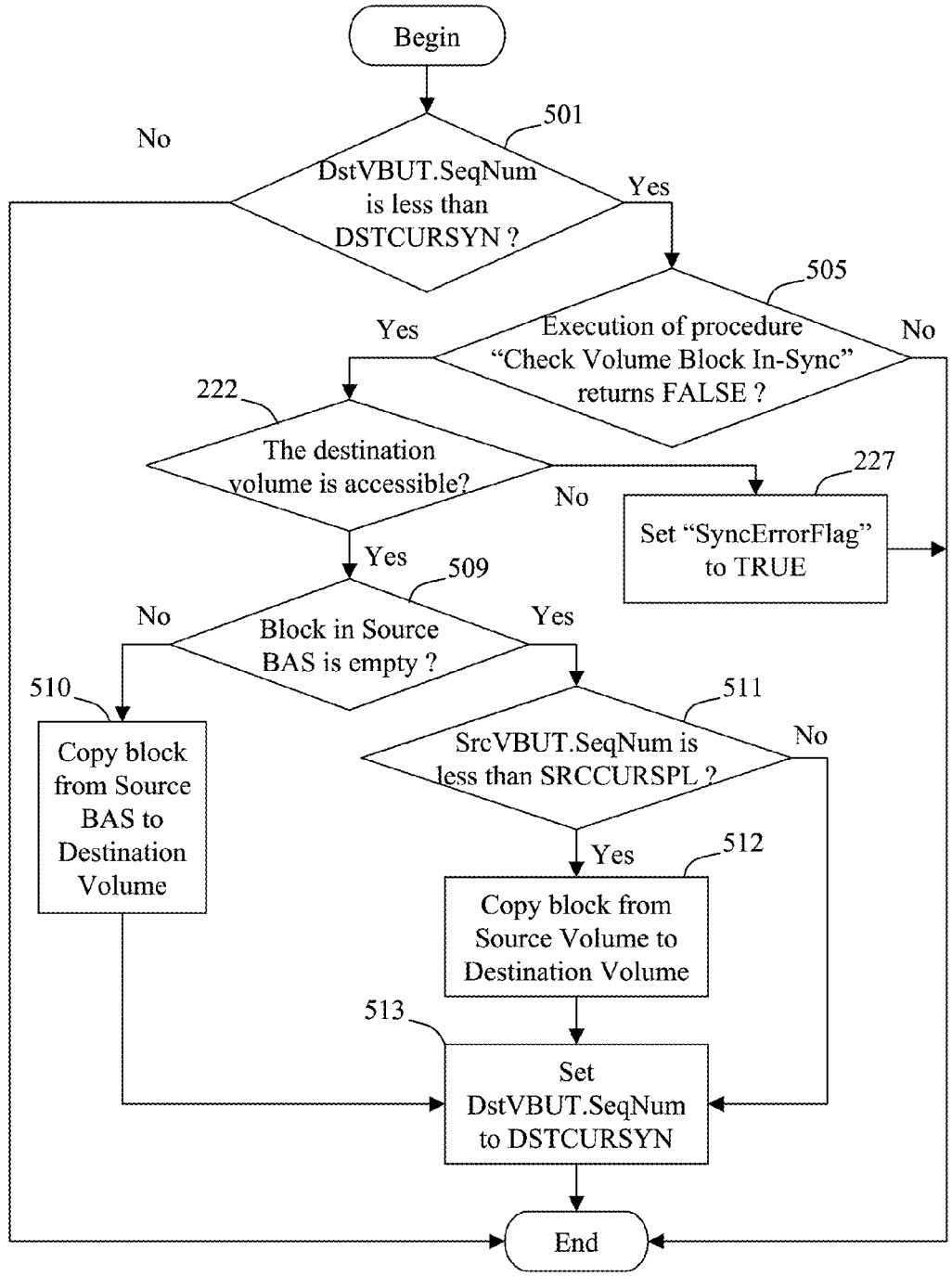
FIG. 8B depicts a flow chart of "Check/Copy Block from Source to Destination Volume" procedure called by the process of the background copy according to an embodiment of the present invention.

Reference is made to FIGS. 8A and 8B, which depict flow charts of "Check/Copy Block from Source to Destination Volume" procedures according to an embodiment of the present invention. Wherein, FIG. 8A is entered due to the call from step 224 of FIG. 6D, in which the process is triggered by the Host IO request, and FIG. 8B is entered due to the call from step 402 of FIG. 7, in which the process is triggered by the background copy operation. The two different call sources send different values provided for determining that the data of the Source Volume 71 needs only to be backup-on-write (BOW) on the local site (FIG. 8A) or the data of the Source BAS 72 or the Source Volume 71 needs to be replicated to the Destination Volume 75 on the remote site (FIG. 8B).

Figure 9:
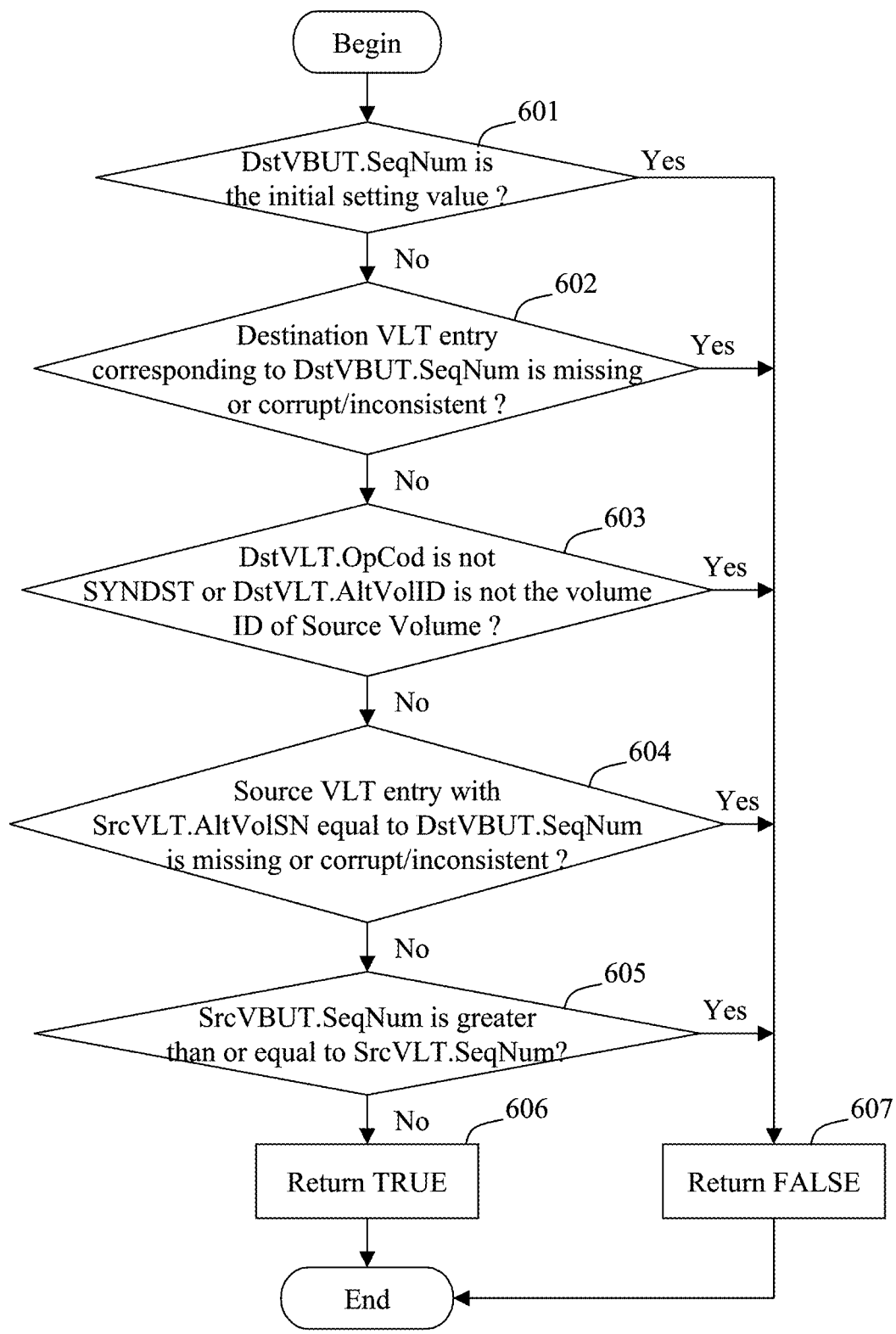
FIG. 9 depicts a flow chart of checking the volume block in synchronization (Check Volume Block In-Sync) process according to an embodiment of the present invention.

Referring to FIG. 8A, at first step 501 is performed to determine if the DstVBUT.SeqNum (standing for the sequence number of the VBUT entry, which is currently processes, of the destination volume) is less than the value of the DSTCURSYN variable (the second variable). If the determination result of step 501 is "yes", step 505 is performed to execute the procedure of "Check Volume Block In-Sync" (the details of which are shown in FIG. 9 and will be described later) and determine if its returned value is "FALSE". If the determination result of step 505 is "yes", it means that the corresponding data blocks of the source volume and the destination volume are not synchronized yet. Because this procedure is entered due to the process of the Host IO request, a backup-on-write operation is accordingly activated in step 507. If the data of the data block, which is currently processed, of the source volume is different from the corresponding one of the destination volume, the backup-on-write operation only needs to backup the data of the source volume to the Source BAS 72, without copying the data to the destination volume. If the determination result of step 505 is "no", it means that the corresponding data blocks of the source volume and the destination volume are already synchronized. Therefore, the procedure goes to the end because no further process is needed. Back to step 501, if the determination result of step 501 is "no", it means that the corresponding data block of the destination is already updated and thus the data block is skipped. After step 507 or the determination result of step 501 is "no", the process flow goes to the end and returns to step 224 of FIG. 6D, which called this procedure, for continuously performing the rest of the steps. The process flow finally goes to step 220 of FIG. 6C to respond the host 11 that its Host IO request is complete.

Referring to FIG. 8B, this procedure is entered due to the call of the background copy process, for background copying the data on the local site 1 to the Destination Volume 75 on the remote site 2. In FIG. 8B, it firstly determines if the DstVBUT.SeqNum (standing for the sequence number of the VBUT entry, which is currently processes, of the destination volume) is less than the value of the DSTCURSYN variable (the second variable) (step 501). If the determination result of step 501 is "yes", step 505 is performed to call "Check Volume Block In-Sync" procedure, the details of which is shown in FIG. 9 and will be described later, and to determine whether the returned value is "FALSE" or not. If the determination result of step 505 is "yes", it means that the corresponding data blocks of the source volume and the destination volume are not synchronized yet. Next, step 222 is performed to further determine whether the Destination Volume 75 is accessible or not. If the Destination Volume 75 cannot be accessed at the time, a synchronization error flag (SyncErrorFlag) is set to "TRUE" (step 227). If the determination result of step 222 is "yes", it means that the Destination Volume 75 is accessible at the time and then the operation of copying data to the Destination Volume 75 is considered. Prior to copying data, it is firstly determined that the corresponding data block of the Source BAS 72 is empty or not (step 509). If the determination result of step 509 is "no", it means that the original data of the corresponding data block of the Source Volume 71 is already "backuped-on-write (BOW)" to the Source BAS 72, and thus step 510 is performed to directly copy the data of the corresponding data block of the Source BAS 72 to the Destination Volume 75 on the remote site 2. If the determination result of step 509 is "yes", it means that the original data of the corresponding data block of the Source Volume 71 is not "backuped-on-write (BOW)" to the Source BAS 72. In this situation, whether the data of the corresponding data block of the Source Volume 71 needs to be copied to the Destination Volume 75 is judged according to the determination result of step 511, which determines whether the SrcVBUT.SeqNum (standing for the sequence number of the VBUT entry, which is currently processed, of the source volume) is less than the first variable (SRCCURSPL) or not. If the determination result of step 511 is "yes", it means that the data of the corresponding data block of the Source Volume 71 is not updated after the split time point, and thus step 512 is performed to synchronize the data of the corresponding block of the Source Volume 71 to the Destination Volume 75. If the determination result of step 511 is "no", it means that the corresponding data block of the Source Volume 71 has been updated after the split time point, and the two volumes 71 and 75 have the same data of the corresponding data blocks at the split time point. Thus, no further copying process is needed.

It should be noted that, when the present invention adopts the PIT differential backup structure shown in FIG. 4B, implying that the Destination Volume 75 on the remote site also need to perform the "backuped-on-write (BOW)" operation, the original data stored in the to-be-written block of the Destination Volume 75 has to be "backuped-on-write (BOW)" to the Destination BAS 76 before the Destination Volume 75 is being written data in step 510 and step 512.

After step 510 or 512 or if the determination result of step 511 is "no", step 513 is performed to set the DstVBUT.SeqNum (standing for the sequence number of the VBUT entry, which is currently processed, of the destination volume) equal to the value of the DSTCURSYN (the second variable). It means that the data of the corresponding data block of the Destination Volume 75 is changed because of the event represented by the value of the DSTCURSYN (the second variable). And then, the procedure goes to the end.

Referring to step 501 again, if the determination result of step 501 is "no", it means that the data of the corresponding data block of the Destination Volume 75 has been updated. Thus, the data block is skipped and the procedure of FIG. 8B goes to the end.

Reference is made to FIG. 9, which depicts a flow chart showing a procedure of checking whether the volume blocks of the source volume and the destination volume are in synchronization or not ("Check Volume Block In-Sync" procedure) according to an embodiment of the present invention. This procedure is called by step 505 of FIGS. 8A and 8B. This procedure mainly includes five determination conditions. The procedure returns a message of "FALSE" (step 607) as long as any one of the five determination conditions is met. On the contrary, the procedure returns a message of "TRUE" (step 606) if all of the five determination conditions are not met. The five determination conditions are described in detail as follows.

The determination condition 1 performed at step 601 is to determine whether the DstVBUT.SeqNum (standing for the sequence number of the VBUT entry, which is currently processed, of the destination volume) is equal to the initial setting value, such as "0 (NULL)". If the determination result of step 601 is "yes", it means that the data block is still in the stage of the initializing operation and certainly is not at "In-Sync (already in synchronization)" state. Thus, a message of "FALSE" is returned (step 607). Otherwise, the procedure goes to check the next determination condition.

The determination condition 2 performed at step 602 is to determine whether the VLT entry of the destination volume associated with the DstVBUT.SeqNum (standing for the sequencel number of the VBUT entry, which is currently processed, of the destination volume) is missing, or can be found but the data cannot be read (maybe corrupted), or the data is inconsistent with each other. If the determination result of step 602 is "yes", a message of "FALSE" is returned (step 607). Otherwise, this procedure goes to check the next determination condition.

The determination condition 3 performed at step 603 is to determine whether the DstVLT.OpCod (standing for the "operation code (OpCod)"recorded in the second field 32 of the VLT entry, which is currently processed, of the destination volume) is not "SYNDST", or the DstVLT.AltVolID (standing for the "alternative volume ID (AltVolID)"recorded in the third field 33 of the VLT entry, which is currently processed, of the destination volume) is not the volume ID of the source volume corresponding thereto. If the determination result of step 603 is "yes", a message of "FALSE" is returned (step 607). Otherwise, this procedure goes to check the next determination condition.

The determination condition 4 performed at step 604 is to determine whether the VLT entry of the source volume with the SrcVLT.AltVolSN (standing for the sequence number (AltVolSN) of the VLT entry of the destination volume recorded in the fourth field 34 of the VLT entry of the source volume), which is equal to the DstVBUT.SeqNum (standing for the sequence number of the VBUT entry, which is currently processed, of the destination volume), is missing, or can be found but cannot be read (maybe corrupted) or is inconsistent with each other. If the determination result of step 604 is "yes", a message of "FALSE" is returned (step 607). Otherwise, this procedure goes to check the next determination condition.

The determination condition 5 performed at step 605 is to determine whether the SrcVBUT.SeqNum (standing for the sequence number of the VBUT entry, which is currently processed, of the source volume) is greater than or equal to the SrcVLT.SeqNum (standing for the sequence number (SeqNum) recorded in the first field 31 the VLT entry, which is currently processed, of the source volume). If the determination result of step 605 is "yes", it means that the data in the data block of the source volume is changed again after being synchronously replicated to the destination volume, and thus a message of "FALSE" is returned (step 607). Otherwise, a message of "TRUE" is returned (step 606).

If an event that the connection to the Source Volume 71 is failed occurs, and before this event the synchronous/asynchronous replication operation between the two volumes 71 and 75 is incomplete, thus an "asynchronous replication failover process (Async replication failover process)" will begin. In the meanwhile, the Destination Volume 75 will execute a "rollback" operation, which allows itself data to rollback to the state recorded in the Destination BAS 76. Each Destination VBUT entry associated with the data block being rollbacked is updated accordingly. If the Source Volume 71 is back to online later, an "asynchronous replication failback process (Async replication failback process)" may be started. The failback process can force the data blocks being rollbacked to be reversely synchronized from the Destination Volume 75 to the Source Volume 71. However, it should be noted that, the data blocks of the Destination Volume 75, which are not synchronized to the Source Volume 71 yet, are also labeled as "to be synchronized to the Source Volume 71", because the VBUT entries of the Source Volume 71 may differ from the ones of the Destination Volume 75. By using this measure together with the update of the Destination VBUT during the rollback operation, it is assured that the Source Volume 71 is identical to the Destination Volume 75 after the failback process.

Figure 10:
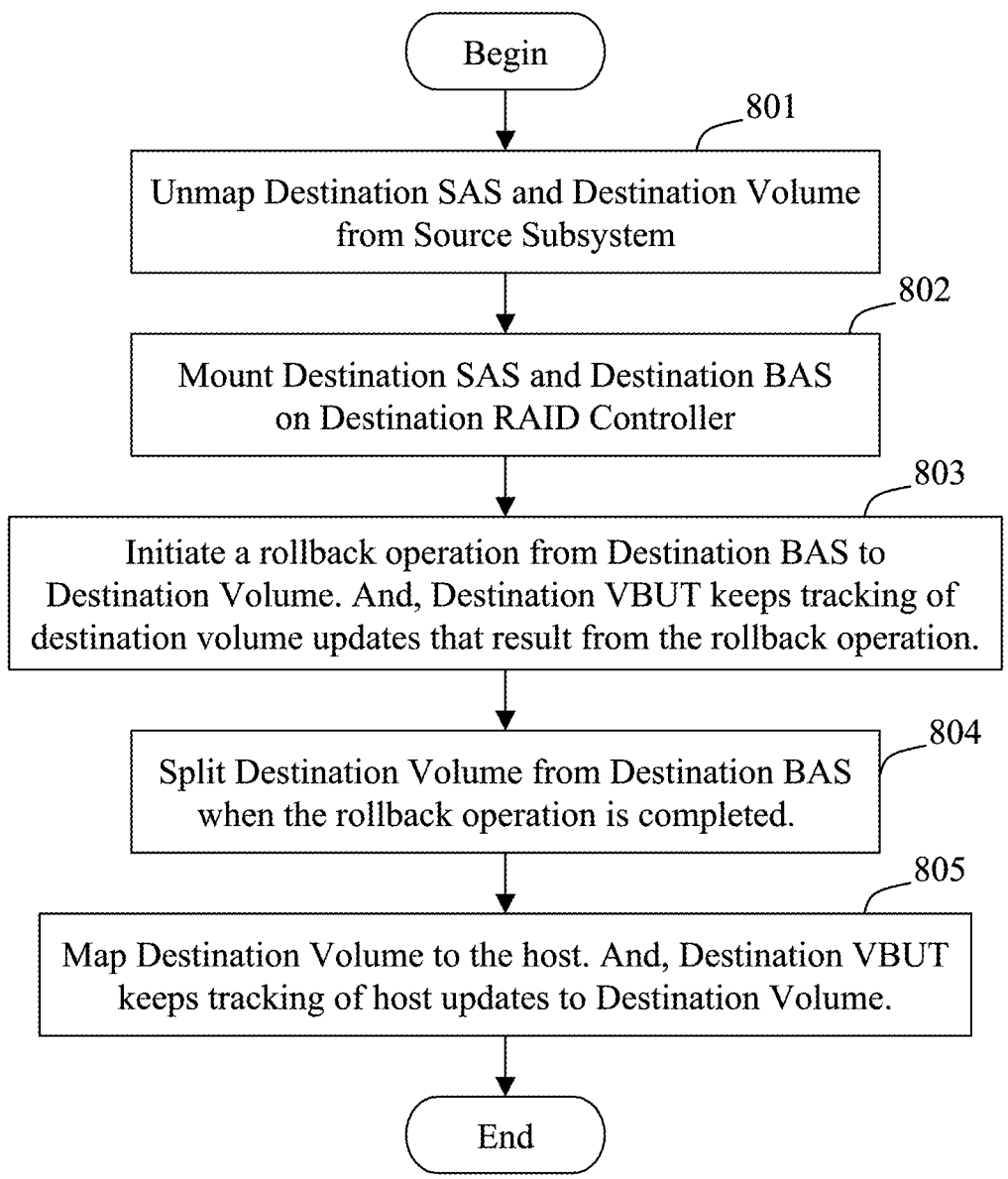
FIG. 10 depicts a flow chart of the asynchronous replication failover process (Async replication failover process) according to an embodiment of the present invention.

Reference is made to FIG. 10, which depicts an asynchronous replication failover process (Async replication failover process) including five steps according to an embodiment of the present invention described in the below.

Firstly, in step 801, the Destination Volume 75 and its section allocation system (referred to as the Destination SAS) are unmapped from the source subsystem on the local site. This measure can assures that only one subsystem (i.e. the SVS 22 on the remote site) can access the Destination Volume 75 and the Destination SAS after performing the failover process.

In step 802, the Destination SAS and the Destination BAS 76 are mounted on the SVC 23 of the SVS 22 on the remote site.

In step 803, a rollback operation is initialized, for recovering the data of the Destination Volume 75 back to the state recorded in the Destination BAS 76; in the meanwhile, the VBUT (Destination VBUT) of the Destination Volume keeps tracking and recording the data update caused by the rollback operation.

In step 804, when the rollback operation is completed, the Destination Volume 75 is spilt off from the Destination BAS 76.

In step 805, the Destination Volume 75 is mapped to the host 11 for serving the requests of the host 11; in the meanwhile, the Destination VBUT keeps tracking and recording the data update made by the host 11 to the Destination Volume 75.

Figure 11:
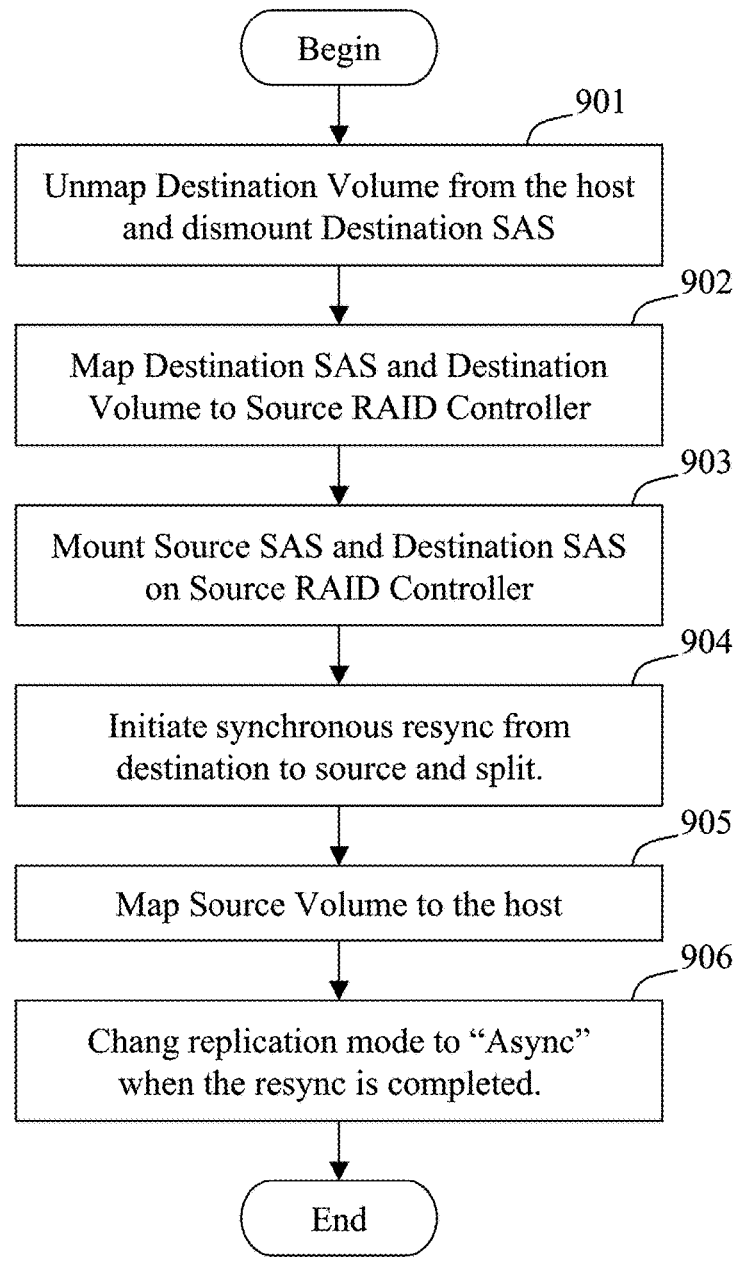
FIG. 11 depicts a flow chart of the asynchronous replication failback process (Async replication failback process) according to a first embodiment of the present invention.
Figure 12A:
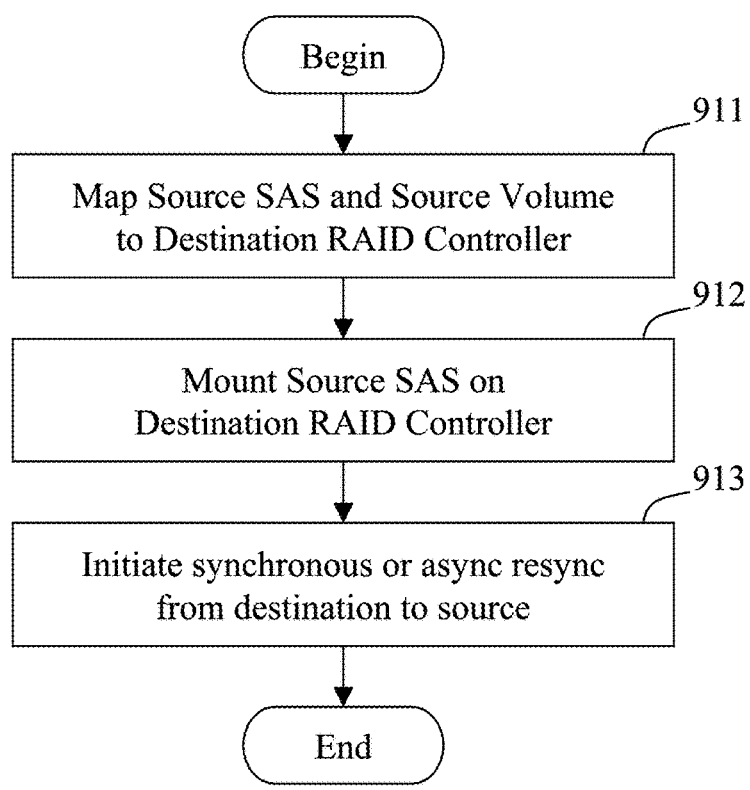
FIGS. 12A to 12B depict a flow chart of the asynchronous replication failback process (Async replication failback process) according to a second embodiment of the present invention.
Figure 12B:
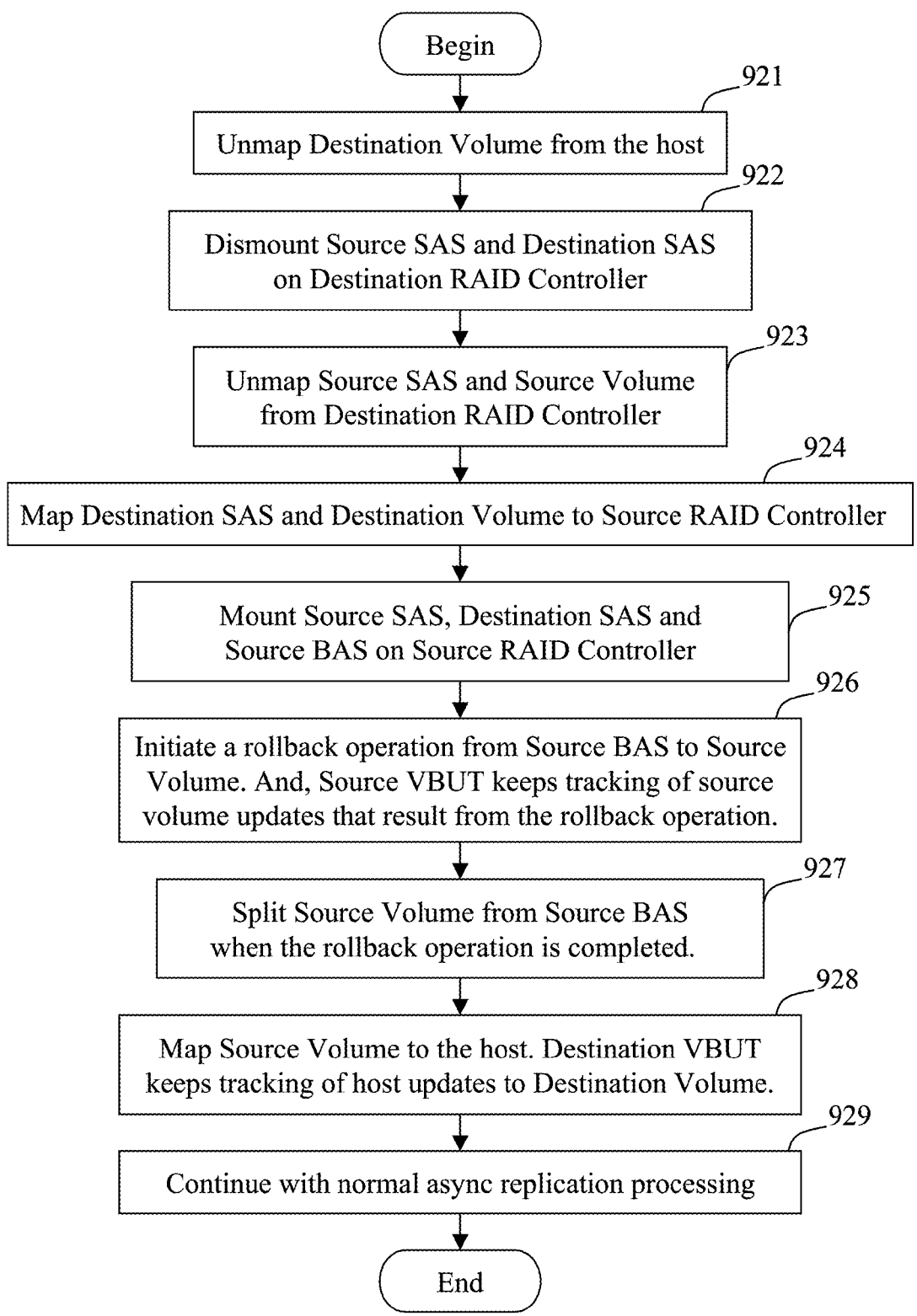

With respect to the asynchronous replication failback process (Async replication failback process), the present invention discloses two embodiments, one of which depicted in FIG. 11 is mastered by the SVC 13 on the local site (or called the Source RAID Controller) to execute the resynchronized (Resync) operation, and the other one of which depicted in FIGS. 12A and 12B is mastered by the SVC 23 on the remote site (or called the Destination RAID Controller) to execute the Resync operation. The details of the two processes are described as follows.

Reference is made to FIG. 11, which depicts a flow chart of the asynchronous replication failback process (Async replication failback process) mastered by the SVC 13 (or called the Source RAID Controller) on the local site. During the asynchronous replication failover process (Async replication failover process), the SVC 23 on the remote site has become the master of the whole system. Thus, in the beginning of the process, the master relationship must be shifted back to the SVC 13 (or called the Source RAID Controller) on the local site. Then, the Resync operation can be executed to synchronize the Destination Volume 75 to the Source Volume 71.

In step 901, the Destination Vloume 75 is unmapped from the host 11 and the Destination SAS is dismounted. In step 902, the Destination Volume 75 and the Destination SAS are mapped to the SVC 13 on the local site (or called the Source RAID Controller). In step 903, the section allocation system of the source volume (referred to as the Source SAS) and the Destination SAS are mounted on the Source RAID Controller (SVC) 13. In step 904, a "synchronous resynchronization (synchronous resync)" operation is initialized, for synchronously replicating the data of the Destination Volume 75 to the Source Volume 71 and then spliting the two volumes 71 and 75. In step 905, the Source Volume 71 is mapped to the host 11 for data accessing. In step 906, when the "synchronous resynchronization (synchronous resync)" operation is completed, the replicating mode between the source volume and the destination volume is changed to the "asynchronization (Async)" operation.

Reference is made to FIG. 12A and FIG. 12B, which depict flow charts of the asynchronous replication failback process (Async replication failback process) mastered by the SVC 23 on the remote site (or called the Destination RAID Controller). Wherein FIG. 12A depicts the flow chart of the resynchronization operation mastered by the SVC 23 on the remote site (or called the Destination RAID Controller). The steps of FIG. 12A are described as follows. In step 911, the Source Volume 71 and the Source SAS are mapped to the SVC 23 on the remote site (or called the Destination RAID Controller). In step 912, the Source SAS is mounted on the SVC 23 on the to remote site (or called the Destination RAID Controller). In step 913, a "synchronous or asynchronous resynchronization (synchronous or async resync)" operation is initialized, for synchronously or asynchronously replicating the data of the Destination Volume 75 to the Source Volume 71. After the completion of step 913, the process flow for the rollback procedure shown in FIG. 12B is then executed as follows. In step 921, the Destination Volume 75 is unmapped from the host 11. In step 922, the Destination SAS and the Source SAS are dismounted from the SVC 23 on the remote site (or called the Destination RAID Controller). In step 923, the Source Volume 71 and the Source SAS are unmapped form the SVC 23 on the remote site (or called the Destination RAID Controller). In step 924, the Destination Volume 75 and the Destination SAS are mapped to the SVC 13 on the local site (or called the Source RAID Controller). In step 925, the Source SAS, the Destination SAS and the Source BAS 72 are mounted on the SVC 13 on the local site (or called the Source RAID Controller). In step 926, a rollback procedure is initialized for recovering the data of the Source Volume 71 back to the state recorded in the Source BAS 72. In the meanwhile, the VBUT of the source volume (referrede to as the Source VBUT) keeps tracking and recording the data update of the Source Volume 71 caused by the rollback procedure. In step 927, the Source Volume 71 is split off from the Source BAS 72 when the rollback procedure is complete. In step 928, the Source Volume 71 is mapped to the host 11 for data accessing, and the VBUT of the destination volume (referred to as the Destination VBUT) keeps tracking and recording the data update of the Destination Volume 75. In step 929, the procedure continues with normal asynchronous (Async) replication processing.

A practical example is taken in the below to interpret how to use the "point-in-time differential backup" technology to perform the remote asynchronous volume replication operation, and the system operation performance can be kept at a certain level. This practical example is exemplified according to the volume snapshot structure shown in FIG. 4B.

Figure 13A:
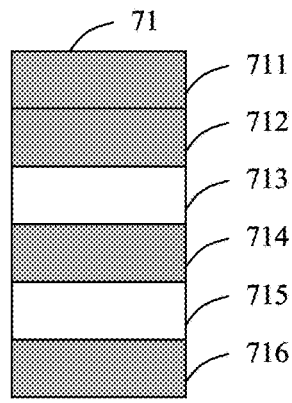
FIGS. 13A to 13D depict an implemented example of the present invention.
Figure 13B:
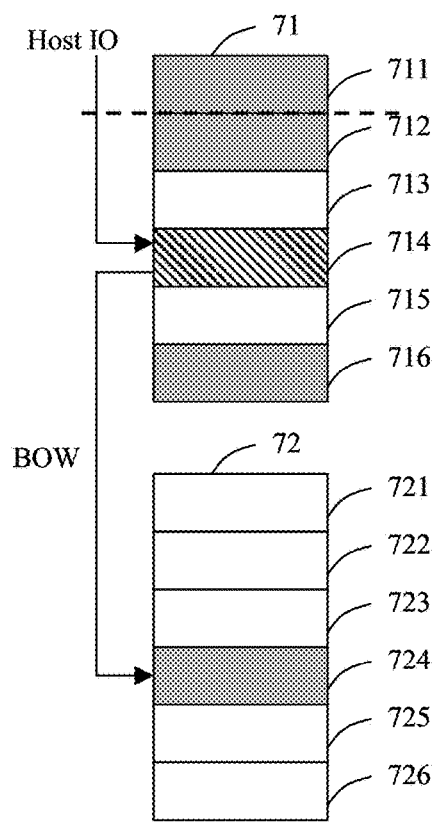
Figure 13C:
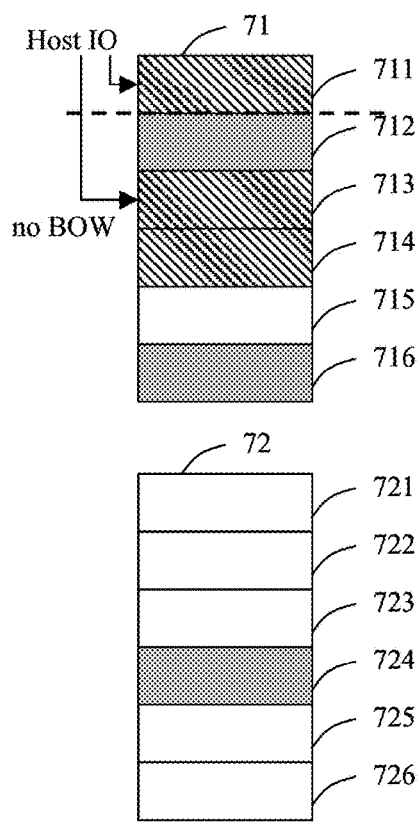
Figure 13D:
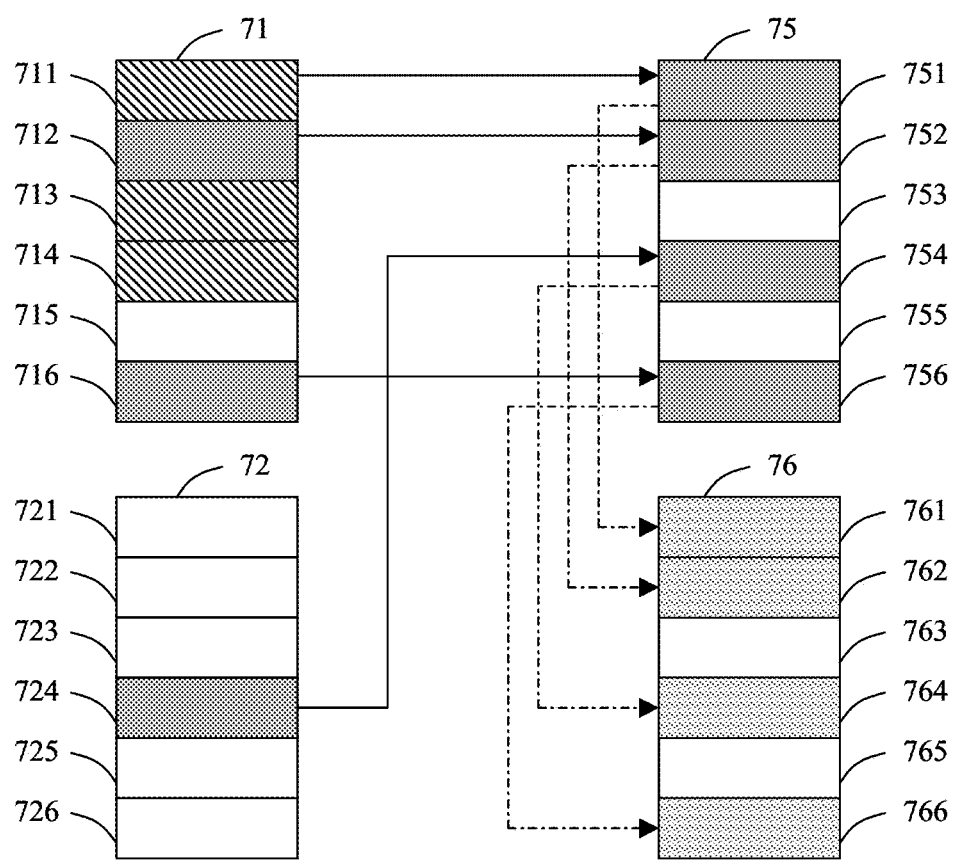

Reference is made to FIG. 13A. It is assumed that a Source Volume 71 has six data blocks, including the first data block 711, the second data block 712, the third data block 713, the fourth data block 714, the fifth data block 715 and the six data block 716. Prior to the beginning of a resynchronization (Resync) operation within the remote asynchronous volume replication operation, the data stored in the first data block 711, the second data block 712, the fourth data block 714 and the six data block 716 of the Source Volume 71 are different from the data of the corresponding data blocks of the Destination Volume 75 on the remote site; however, the data stored in the third data block 713 and the fifth data block 715 are identical to the data of the corresponding blocks of the Destination Volume 75 on the remote site. Referring to FIGS. 13B to 13D simultaneously, after the beginning of the resynchronization (Resync) operation, the system establishs a Source BAS 72 corresponding to the Source Volume 71 on the local site, as well as establishs a Destination BAS 76 (shown in FIG. 13D) corresponding to the Destination Volume 75 on the remote site. In the period of the resynchronization (Resync) operation, a Host IO request firstly writes data into the fourth data block 714 (shown in FIG. 13B), and then another two Host IO requests write data into the first data block 711 and the third data block 713 (shown in FIG. 13C). During the period that the three Host IO requests appear, the background copy procedure only copys the data of the first data block 711 to the Destination Volume 75 on the remote site, but other data blocks have not been synchronized yet. The achieved percentage of the background copy procedure is indicated by a horizontal boldface dashline in FIGS. 13B and 13C. As such for the Host IO request depicted in FIG. 13B, the data of the fourth data block 714 is not yet copied to the Destination Volume 75 on the remote site, and the data of the fourth data block 714 is different from the data of the corresponding data block of the Destination Volume 75. Hence, prior to writing the Host IO data into the fourth data block 714, the original data of the fourth data block 714 is necessarily to be "backuped-on-write (BOW)" first. That is, copying the original data of the fourth data block 714 of the Source Volume 71 to the corresponding fourth data block 724 of the Source BAS 72, so that the data status of the fourth data block 714 of the Source Volume 71 is reserved at the "split" time point (i.e. at the beginning of the resynchronization (Resync) operation) for subsequently background copying to the Destination Volume 75. As such for the two Host IO requests depicted in FIG. 13C, the data of the first data block 711 has been synchronized to the first data block 751 of the Destination Volume 75 on the remote site, and the data of the third data block 713 is originally the same with the data of the third data block 753 of the Destination Volume 75. Thus, with respect to the two Host IO requests, no backuped-on-write (BOW) operation performed on the data of the Source Volume 71 is needed according to the present invention.

It should be noted that, as shown in FIG. 13C, the present invention deals with the Host IO requests with a simplified process, in which the backup-on-write (BOW) operation is only performed on the data blocks of the Source Volume 71 that need data backup, such as those storing different data from the ones of the Destination Volume 75.

Reference is made to FIG. 13D, which depicts the replication relationships between the data blocks while performing the background copy procedure. Reference is also made to FIG. 8B, it is firstly check whether there is is data stored in the corresponding data block of the Source BAS 72 or not (step 509). If it is "yes", the background copy procedure directly copys the data of the corresponding data block of the Source BAS 72 to the Destination Volume 75 (step 510). For example, in FIG. 13D, the data of the fourth data block 724 of the Source BAS 72 is copied to the fourth data block 754 of the Destination Volume 75. If the corresponding block of the Source BAS 72 is empty, it is then to determine whether the data of the corresponding block of the Source Volume 71 is needed to be copied to the Destination Volume 75 or not. The determination mechanism depends on step 511 of FIG. 8B. In step 511, it is determined whether the SrcVBUT.SeqNum is less than the first variable (SRCCURSPL) or not. If the determination result of step 511 is "yes", it means that the data of the corresponding data block of the Source Volume 71 is not updated yet and it also means that the two corresponding data blocks of the volumes 71 and 75 are not synchronized yet after the split time point. Thus, the data of the corresponding data block of the Source Volume 71 is remotely synchronized to the Destination Volume 75 (step 512). For example, in FIG. 13D, the three data sets of the first data block 711, the second data block 712 and the sixth data block 716 of the Source Volume 71 are copied to the first data block 751, the second data block 752 and the sixth data block 756 of the Destination Volume 75. If the determination result of step 511 is "no", it means that the data stored in the data block of the Source Volume 71 has been updated and it also means that the two corresponding data blocks of the volumes 71 and 75 have the same data at the split time point. Thus, no data synchronization operation is needed. For example, the third data block 713 and the fifth data block 715 of the Source Volume 71 need no data synchronization operation. Every action of writing data into the data blocks of the Destination Volume 75 as mentioned above is necessarily accompanied with a "backup-on-write (BOW)" process. In other word, the data of the data block, which is to be written, of the Destination Volume 75 is firstly "backuped-on-write (BOW)" to the corresponding data block of the Destination BAS 76. For example, the four original data sets of the first data block 751, the second data block 752, the fourth data block 754 and the six data block 756 of the Destination Volume 75 are necessarily "backuped-on-write (BOW)" to the first data block 761, the second data block 762, the fourth data block 764 and the six data block 766 of the Destination BAS 76.

In summary, the present invention takes advantage of the technologies of asynchronous replication and point-in-time differential backup to perform the data replication between the local site and the remote site. The completion message of the host IO request can be firstly responded to the host before the data is actually synchronized to the remote site by the background copy procedure, so as to prevent the system from a great deal of waiting time for the data transmission via the communication medium. Moreover, with respect to the "backup-on-write (BOW)" technology disclosed in the present invention, the data will bebackuped to the point-in-time differential backup image only when it is really necessary to be backuped, so that the data processing can be simplified.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for asynchronous replication of volumes, comprising steps of:
    mirroring a source volume located on a first site to a destination volume located on a second site to form a mirroring pair, wherein, before the mirroring step, at least a part of the source volume and a part of the destination volume have once been in a synchronous status, wherein the source volume has a first set of update information for recording the updated status information of each data block of the source volume and has a first set of log information for recording the synchronous status information between the source volume and the destination volume, and the destination volume has a second set of update information for recording the updated status information of each data block of the destination volume and has a second set of log information for recording the synchronous status information between the destination volume and the source volume;
    receiving a Host input/output (IO) request, wherein the Host IO request is sent from a host located on the first site for writing an updated data set into a first data block of the source volume;
    executing a backup-on-write operation upon receipt of the Host IO request, wherein the backup-on-write operation further comprises steps of:
    determining, according to the first set of update information and the first set of log information of the source volume and the second set of update information and the second set of log information of the destination volume, whether an original data set of the first data block of the source volume where the original data set of the first data block is not yet physically copied to the destination volume, is the same as a data set of a second data block of the destination volume, where the second data block corresponds to the first data block;
    obtaining a determination result;
    not backing up the original data set to a first backup image located on the first site if the determination result shows that the original data set of the first data block of the source volume is the same as the data set of the second data block of the destination volume; and
    backing up the original data set to the first backup image located on the first site if the determination result shows that the original data set of the first data block of the source volume is different from the data set of the second data block of the destination volume;
    writing the updated data set into the first data block of the source volume; and
    informing the host of completion of the Host IO request.

2. The method of claim 1, further comprising:
    performing a copy procedure for copying the data stored in the first backup image or stored in the source volume into the destination volume.

3. The method of claim 1, further comprising:
    splitting the mirroring pair immediately after forming the mirroring pair.

4. The method of claim 1, wherein the synchronous status is achieved by performing an initial synchronization procedure for mirroring the source volume to the destination volume.

5. The method of claim 1, the synchronous status is achieved by deeming the source volume and the destination volume being in the synchronous status if no data is stored in the source volume.

6. The method of claim 1, the synchronous status is achieved by creating a mirroring image of the source volume on the first site and replicating the mirroring image of the source volume to the destination volume.

7. The method of claim 1, wherein the first set of update information constitutes a first update table and the second set of update information constitutes a second update table.

8. The method of claim 7, wherein the first set of log information constitutes a first log table and the second set of log information constitutes a second log table.

9. The method of claim 8, further comprising:
    allocating a first entry in the first log table of the source volume, and initializing a plurality of fields of the first entry comprising: setting a sequence number (SeqNum) defined in a first field to an initial setting value; and setting an operation code (OpCod) defined in a second field to an operation code representing a state of the source volume; wherein the initial setting value recorded in the first field is further assigned to a first variable;
    allocating a second entry in the second log table of the destination volume, and initializing a plurality of fields of the second entry comprising: setting an OpCod defined in a second field of the second entry to an operation code representing a state of the destination volume;
    adding an increment to a value of a master sequence number variable of the destination volume, and copying the value of the master sequence number variable of the destination volume into a first field of the second entry in the second log table of the destination volume as a sequence number defined therein, and into a fourth field of the first entry in the first log table of the source volume as an alternative volume's sequence number (AltVolSN) defined therein, wherein the value of the master sequence number variable of the destination volume is further assigned to a second variable;
    setting a fourth field of the second entry in the second log table of the destination volume as a starting address, wherein the fourth field of the second entry is used for recording an index of a next data block to be synchronously replicated (DstVLT.NxtSynBlk);
    adding an increment to a value of a master sequence number variable of the source volume, and copying the value of the master sequence number variable of the source volume into a first field of the first entry in the first log table of the source volume as a sequence number defined therein, wherein the value of the master sequence number variable of the source volume is further assigned to the first variable;
    allocating a third entry in the second log table of the destination volume, and initializing a plurality of fields of the third entry comprising: setting an OpCod defined in a second field of the third entry to an operation code representing a split state;
    adding an increment to the value of the master sequence number variable of the destination volume again, and copying the value of the master sequence number variable of the destination volume into a first field of the third entry in the second log table of the destination volume as a sequence number defined therein; and
    determining if the synchronization operation between the source volume and the destination volume is complete.

10. The method of claim 9, further comprising:
    performing a background copy procedure for copying the source volume to the destination volume.

11. The method of claim 9, further comprising:
determining if there is a host IO (Input/Output) request targeting the source volume for data access.

12. The method of claim 11, further comprising:
transforming the host IO request into at least one logical drive (LD) IO request, wherein each of the at least one LD IO request is targeting a data block, which is to be accessed, of the source volume;
determining whether the at least one LD IO request is all complete or not; and
responding a completion message of the host IO request to a host issuing the host IO request.

13. The method of claim 12, wherein, for each of the at least one LD IO request, the method further comprises:
determining if the host IO request is a write request;
executing a first procedure for checking and determining if it is necessary to copy data from the source volume to the first backup image;
writing data of the host IO request to the data block, which is to be accessed, of the source volume; and
setting a sequence number stored in an entry of the first update table of the source volume to be equal to the value of the first variable, in which the entry is associated with the to-be-accessed data block.

14. The method of claim 12, further comprising:
determining if the host IO request is a write request;
determining if the host IO request is targeting the source volume;
determining if the host IO request is targeting the destination volume and determining if a sequence number (DstVBUT.SeqNum) of the entry, which is currently processed, in the second update table of the destination volume is less than a value of the second variable; and
reading data from the data block to be accessed in the source volume or from the corresponding data block in the first backup image.

15. The method of claim 12, further comprising:
determining if the host IO request is a write request;
determining if the host IO request is targeting the source volume;
determining if the host IO request is targeting the destination volume and determining if a sequence number (DstVBUT.SeqNum) of the entry, which is currently processed, in the second update table of the destination volume is less than the value of the second variable; and
reading data from the data block to be accessed in the destination volume.

16. The method of claim 10, wherein the background copy procedure for copying the source volume to the destination volume comprises:
for each data block associated with each entry in the second update table of the destination volume, calling and executing a second procedure for checking and determining if it is necessary to copy data from one of the first backup image and the source volume to the destination volume;
determining if any data block associated with the second update table of the destination volume is not being synchronized yet;
adding the DstVLT.NxtSynBlk recorded in the fourth field of the second entry in the second log table of the destination volume by 1 unit if it is determined that there is a data block associated with the second update table of the destination volume left to be synchronized; and
setting the DstVLT.NxtSynBlk recorded in the fourth field of the second entry in the second log table of the destination volume to a predetermined value used for representing that all of the data blocks have been synchronously replicated if it is determined that all of the data blocks associated with the second update table of the destination volume are already synchronized.

17. The method of claim 13, wherein the first procedure comprises:
determining if a sequence number (DstVBUT.SeqNum) of an entry in the second update table of the destination volume is less than the value of the second variable, in which the entry is associated with a data block being processed;
executing a third procedure for checking whether a volume block is in synchronization, and checking if the third procedure returns information of "FALSE"; and
copying data of the source volume to the first backup image as a backup-on-write operation if the third procedure returns information of "FALSE".

18. The method of claim 16, wherein the second procedure comprises:
determining if a sequence number (DstVBUT.SeqNum) of an entry in the second update table of the destination volume is less than the value of the second variable, in which the entry is associated with a data block being processed;
executing a third procedure for checking whether a volume block is in synchronization, and checking if the third procedure returns information of "FALSE" or not;
determining if the destination volume is accessible or not, if the sequence number (DstVBUT.SeqNum) of an entry in the second update table of the destination volume is less than the value of the second variable and if the third procedure returns information of "FALSE";
determining if a corresponding data block of the first backup image is empty or not, if the destination volume is accessible;
determining if a sequence number (SrcVBUT.SeqNum) of an entry in the first update table of the source volume is less than the first variable, if the corresponding data block of the first backup image is empty; and
setting the DstVBUT.SeqNum to the value of the second variable, if the sequence number (SrcVBUT.SeqNum) of an entry in the first update table of the source volume is not less than the first variable.

19. The method of claim 16, wherein the second procedure comprises:
determining if a sequence number (DstVBUT.SeqNum) of an entry in the second update table of the destination volume is less than the value of the second variable, in which the entry is associated with a data block being processed;
executing a third procedure for checking whether a volume block is in synchronization, and checking if the third procedure returns information of "FALSE" or not;
determining if the destination volume is accessible or not, if the sequence number (DstVBUT.SeqNum) of an entry in the second update table of the destination volume is less than the value of the second variable and if the third procedure returns information of "FALSE";
determining if a corresponding data block of the first backup image is empty or not, if the destination volume is accessible;

copying the data stored in the corresponding data block of the first backup image to the destination volume if the corresponding data block of the first backup image is not empty; and setting the DstVBUT.SeqNum to the value of the second variable.

20. The method of claim 16, wherein the second procedure comprises:

determining if a sequence number (DstVBUT.SeqNum) of an entry in the second update table of the destination volume is less than the value of the second variable, in which the entry is associated with a data block being processed;

executing a third procedure for checking whether a volume block is in synchronization, and checking if the third procedure returns information of "FALSE" or not;

determining if the destination volume is accessible or not, if the sequence number (DstVBUT.SeqNum) of an entry in the second update table of the destination volume is less than the value of the second variable and if the third procedure returns information of "FALSE";

determining if a corresponding data block of the first backup image is empty or not, if the destination volume is accessible;

determining if a sequence number (SrcVBUT.SeqNum) of an entry in the first update table of the source volume is less than the first variable, if the corresponding data block of the first backup image is empty;

copying the data stored in the data block of the source volume to the destination volume, if the sequence number (SrcVBUT.SeqNum) of an entry in the first update table of the source volume is less than the first variable; and setting the DstVBUT.SeqNum to the value of the second variable.

21. The method of claim 17, claim 18, claim 19 or claim 20, wherein the third procedure comprises five determining steps of:

determining if the DstVBUT.SeqNum is equal to an initial setting value;

determining if an entry in the second log table of the destination volume, in which the entry is associated with the DstVBUT.SeqNum, is missing, or can be found but the data cannot be read, or the data are inconsistent;

determining if the operation code (DstVLT.OpCod) recorded in the second field of the entry, which is being processed, in the second log table of the destination volume is not the operation code representing the state of the destination volume; or if an alternative volume's identification (DstVLT.AltVolID) recorded in a third field of the entry, which is currently processed, in the second log table of the destination volume is not an identification code of the source volume corresponding thereto;

determining if an entry in the first log table of the source volume having an alternative volume's sequence number (SrcVLT.AltVolSN), which is equal to the DstVBUT.SeqNum, recorded in the fourth field of the entry, which is being processed, is missing, or can be found but the data cannot be read or the data are not consistent;

determining if a SrcVBUT.SeqNum is greater than or equal to a sequence number (SrcVLT.SeqNum) recorded in the first field of the entry, which is being processed, in the first log table of the source volume; and responding the "FALSE" message if any of the determination results of the five determining steps of the third procedure is "yes", or responding a "TRUE" message if all of the determination results of the five determining steps of the third procedure is "no".

22. The method of claim 9, further comprising an asynchronous replication failover process, which comprises:

unmapping the destination volume and a second section allocation system (SAS) of the destination volume from a first storage virtualization subsystem located on the first site;

mounting the second SAS and a second backup image on a second controller of a second storage virtualization subsystem on the second site, in which the second backup image is stored on the second site;

initializing a rollback operation for recovering data of the destination volume to the state recorded by the second backup image, and using the second update table of the destination volume to keep tracking and recording data changes caused by the rollback operation;

splitting the destination volume from the second backup image; and mapping the destination volume to the host for serving a request from the host, and using the second update table of the destination volume to keep tracking and recording data changes caused by the host.

23. The method of claim 22, further comprising an asynchronous replication failback process, which comprises:

unmapping the destination volume from the host and dismounting the second SAS of the destination volume;

mapping the destination volume and the second SAS to a first controller of a first storage virtualization subsystem located on the first site;

mounting a first SAS of the source volume and the second SAS of the destination volume on the first controller;

initializing a synchronous resynchronization operation for replicating data of the destination volume to the source volume, and splitting the destination volume from the source volume;

mapping the source volume to the host; and changing a replication mode between the source volume and the destination volume to be asynchronous when the synchronous resynchronization operation is complete.

24. The method of claim 22, further comprising an asynchronous replication failback process, which comprises:

mapping the source volume and a first SAS of the source volume to the second controller of the second storage virtualization subsystem located on the second site;

mounting the first SAS of the source volume on the second controller located on the second site; and initializing a synchronous or asynchronous resynchronization operation for synchronously or asynchronously replicating data of the destination volume to the source volume.

25. The method of claim 24, further comprising:

unmapping the destination volume from the host;

dismounting the second SAS of the destination volume and the first SAS of the source volume from the second controller on the second site;

unmapping the source volume and the first SAS from the second controller located on the second site;

mapping the destination volume and the second SAS to the first controller located on the first site;

mounting the first SAS, the second SAS and the first backup image on the first controller located on the first site;

initializing a rollback operation for recovering data of the source volume to the state recorded by the first backup image, and using the first update table of the source volume to keep tracking and recording data changes caused by the rollback operation;

splitting the source volume from the first backup image;

mapping the source volume to the host and using the second update table of the destination volume to keep tracking and recording data changes caused by the host; and performing an asynchronous replication operation.

26. A system for asynchronous volume replication, comprising:

a first storage virtualization subsystem located on a first site, comprising a first controller and a first storage unit, wherein the first storage unit has a first volume and a first backup image;

a second storage unit located on a second site, wherein the second storage unit has a second volume; and a host located on the first site and coupled with the first storage virtualization subsystem, wherein the host sends a Host IO request to the first volume of the first storage virtualization subsystem;

wherein the first volume located on the first site and the second volume located on the second site form a mirroring pair in which the first volume has a first set of update information for recording the updated status information of each data block of the first volume and a first set of log information for recording the synchronous status information between the first volume and the second volume and the second volume has a second set of update information for recording the updated status information of each data block of the second volume and a second set of log information for recording the synchronous status information between the second volume and the first volume, and wherein at least a part of the first volume and a part of the second volume have once been in a synchronous status before forming the mirroring pair;

wherein when the first controller of the first storage virtualization subsystem receives the Host IO request, a backup-on-write operation is executed, which comprises steps of:

determining, according to the first set of update information and the first set of log information of the first volume and the second set of update information and the second set of log information of the second volume, whether an original data set of a first data block, which is to be written, of the first volume is the same as a data set of a second data block of the second volume, where the second data block corresponds to the first data block and the original data set of the first data block is not yet physically copied to the second volume;

obtaining a determination result;

not backing up the original data set to a first backup image located on the first site if the determination result shows that the original data set of the first data block of the first volume is the same as the data set of the second data block of the second volume; and backing up the original data set to the first backup image located on the first site if the determination result shows that the original data set of the first data block of the first volume is different from the data set of the second data block of the second volume;

writing an updated data of the Host IO request into the first data block of the first volume by the first controller; and informing the host of completion of the Host IO request.

27. The system of claim 26, wherein the second storage unit further comprises a second backup image for recording original data of the second volume when the data of the second volume changes.

28. The system of claim 26, wherein the first backup image is administrated by a section allocation system (SAS).

29. The system of claim 28, wherein the section allocation system (SAS) comprising a first attribute block used for recording an identification (ID) of the SAS and at least one ID of at least one media extent associated thereto, a block association set (BAS) related field used for recording information pointing a block association set (BAS) as well as information of the source volume associated with the BAS, and a first journal field used for storing an operating journal so as to provide a recovery while an error or power failure occurs in the system.

30. The system of claim 29, wherein the BAS related field further comprises a section allocation table (SAT) and an inode table.

31. The system of claim 29, wherein the BAS further comprises a second attribute block used for recording an ID of the BAS, a size of the BAS and other relative setting of the BAS, a directory field used for recording a level of a block association table (BAT) and a quantity of the BAT(s) that has(have) been established, a second journal field used for storing an operation journal so as to provide a recovery while an error or power failure occurs in the system, a folder table used for pointing the BAT, and a data area used for storing the first backup image.

32. The system of claim 26, wherein the mirroring pair is split after forming the mirroring pair.

33. The system of claim 26, wherein the first set of update information constitutes a first update table and the second set of update information constitutes a second update table.

34. The system of claim 26, wherein the first set of log information constitutes a first log table and the second set of log information constitutes a second log table.

* * * * *